(12) United States Patent
Utagawa

(10) Patent No.: US 7,016,549 B1
(45) Date of Patent: Mar. 21, 2006

(54) IMAGE PROCESSING METHOD FOR DIRECTION DEPENDENT LOW PASS FILTERING

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 903 days.

(21) Appl. No.: 09/592,285

(22) Filed: Jun. 12, 2000

(30) Foreign Application Priority Data

| | | |
|---|---|---|
| Jun. 14, 1999 | (JP) | ................................. 11-167214 |
| Mar. 31, 2000 | (JP) | ............................. 2000-098937 |

(51) Int. Cl.
*G06K 9/40* (2006.01)

(52) U.S. Cl. ...................... 382/261; 382/262; 382/260; 382/264; 382/269

(58) Field of Classification Search ................ 382/264, 382/269, 260, 261, 262
See application file for complete search history.

(56) References Cited

U.S. PATENT DOCUMENTS

| | | | |
|---|---|---|---|
| 5,253,046 A | * 10/1993 | Shiraishi | ..................... 348/237 |
| 5,561,724 A | 10/1996 | Kido et al. | |
| 5,771,318 A | * 6/1998 | Fang et al. | .................. 382/261 |
| 6,040,858 A | * 3/2000 | Ikeda | .......................... 348/242 |
| 6,091,862 A | * 7/2000 | Okisu | .......................... 382/300 |
| 6,195,467 B1 | * 2/2001 | Asimopoulos et al. | ....... 382/261 |
| 2001/0005429 A1 | * 6/2001 | Ishiga et al. | ................ 382/167 |

* cited by examiner

*Primary Examiner*—Andrew W. Johns
*Assistant Examiner*—Patrick L Edwards
(74) *Attorney, Agent, or Firm*—Oliff & Berridge PLC

(57) ABSTRACT

First similarity values along at least four directions are ascertained within a local area containing a target pixel and weighted averaging is performed by adding the pixel values of pixels around the target pixel value to the pixel value of the target pixel, adding weight along a direction having a small first similarity value (along a direction manifesting a high degree of similarity). By incorporating the pixel value level differences among a plurality of pixels on adjacent lines extending adjacent to the target pixel into the first similarity values, it becomes possible to effectively remove jaggies that are difficult to eliminate in the prior art. Furthermore, by making a judgment on degrees of similarity by incorporating color information such as characteristics differences among different color pixels, a more accurate judgment can be made with regard to the image structure to enable very accurate direction-dependent low-pass filtering.

10 Claims, 8 Drawing Sheets

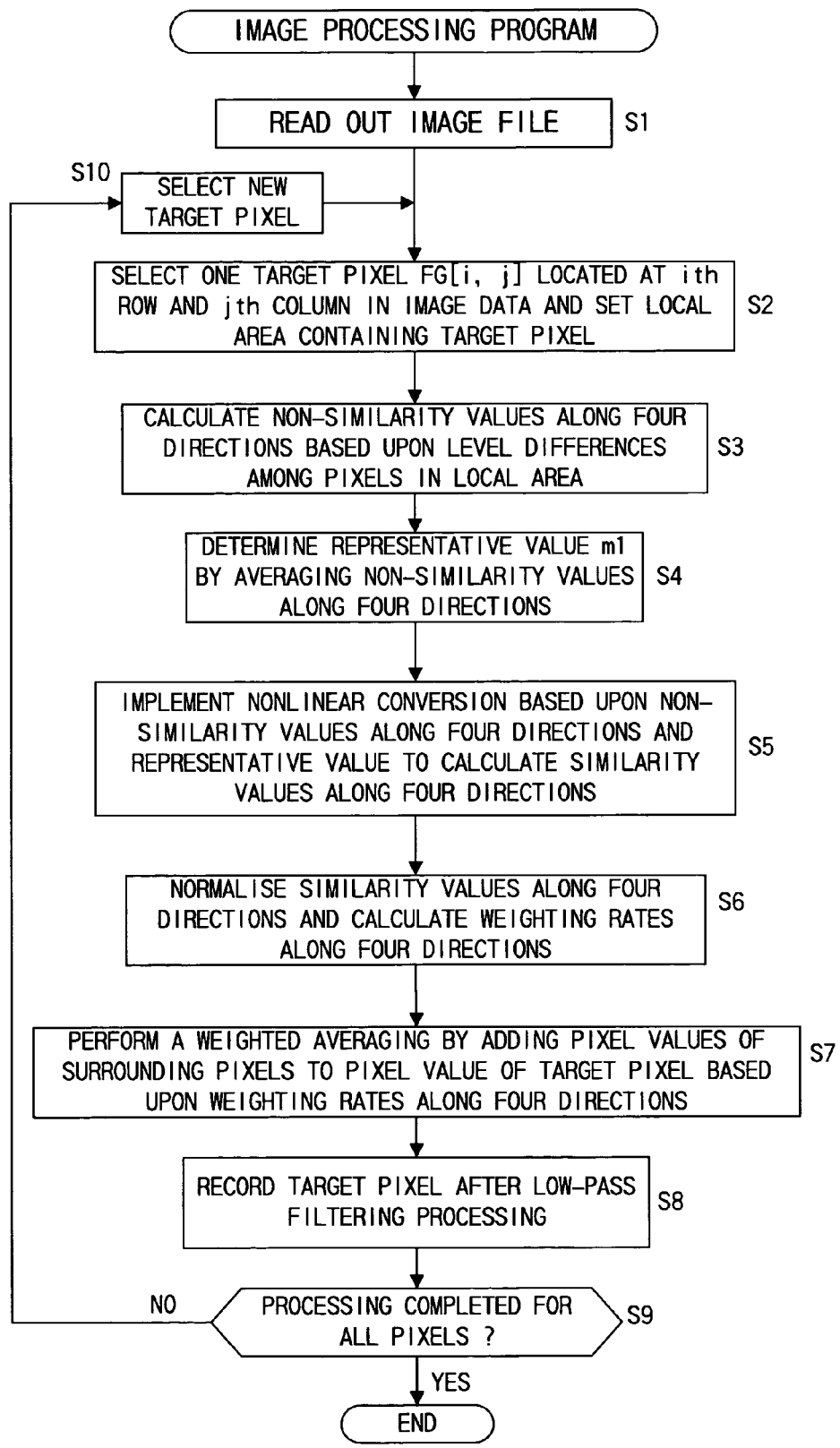

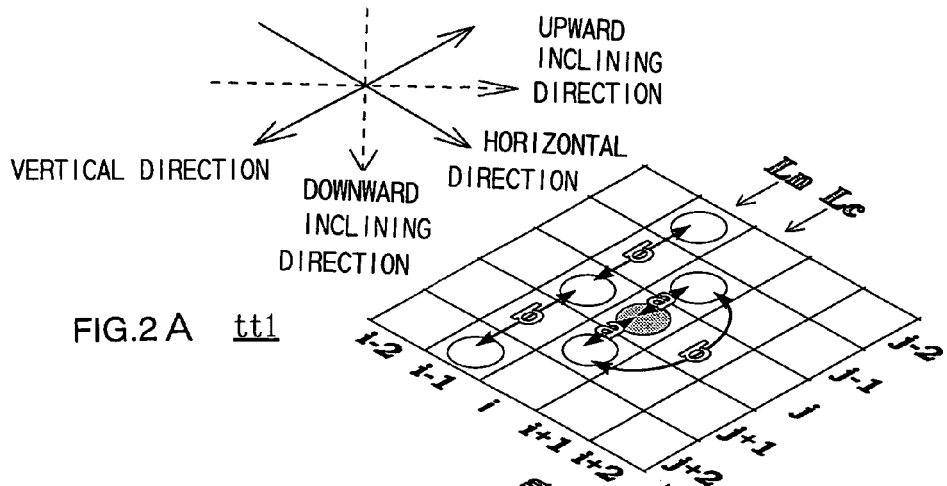
FIG.2A  tt1
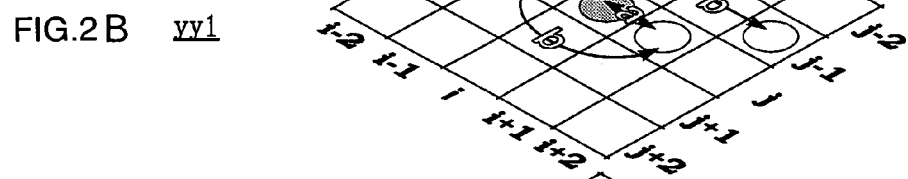
FIG.2B  yy1
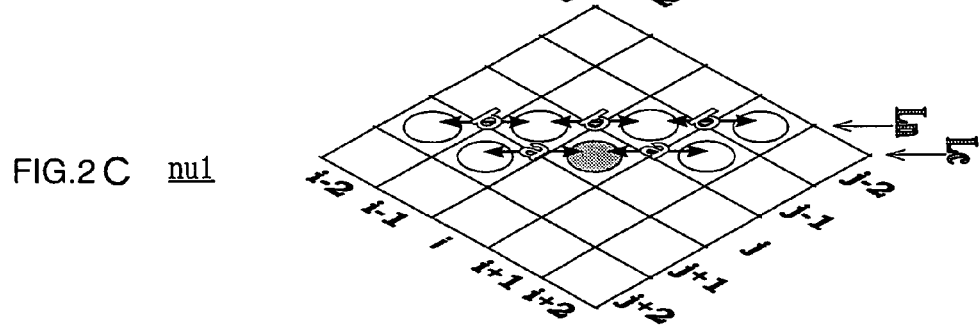
FIG.2C  nu1
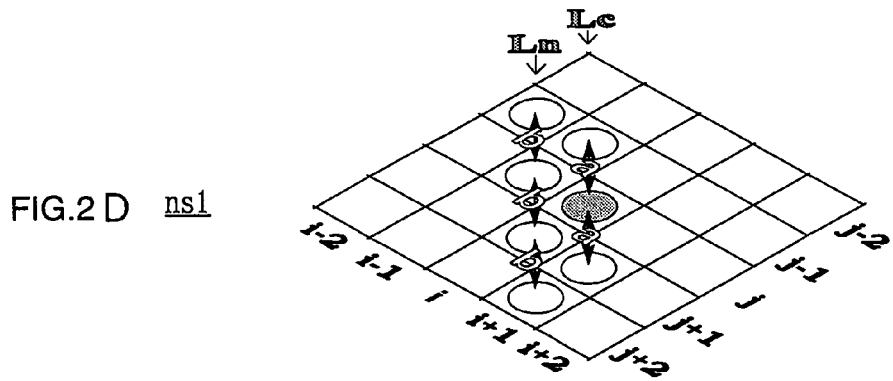
FIG.2D  ns1

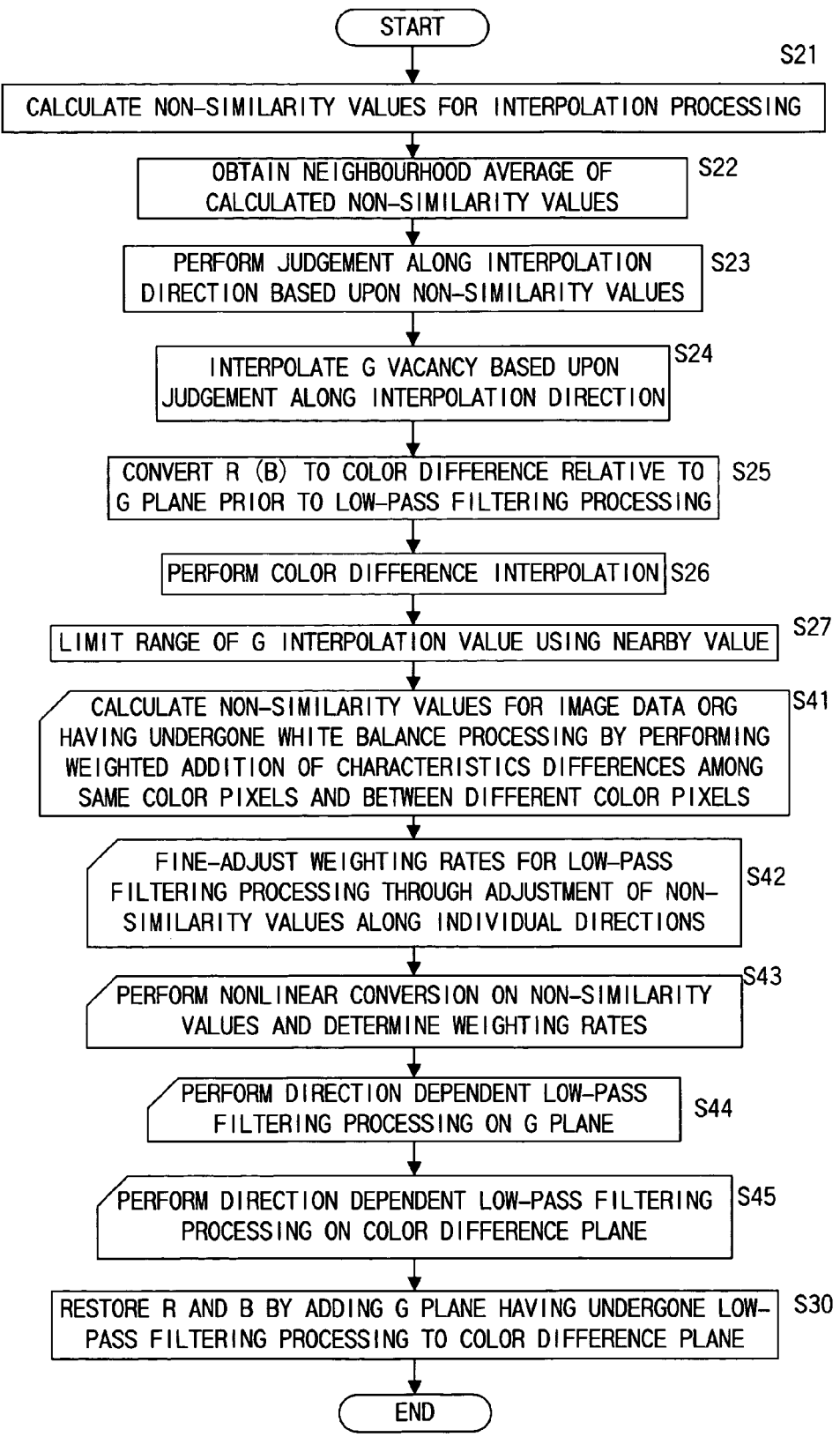

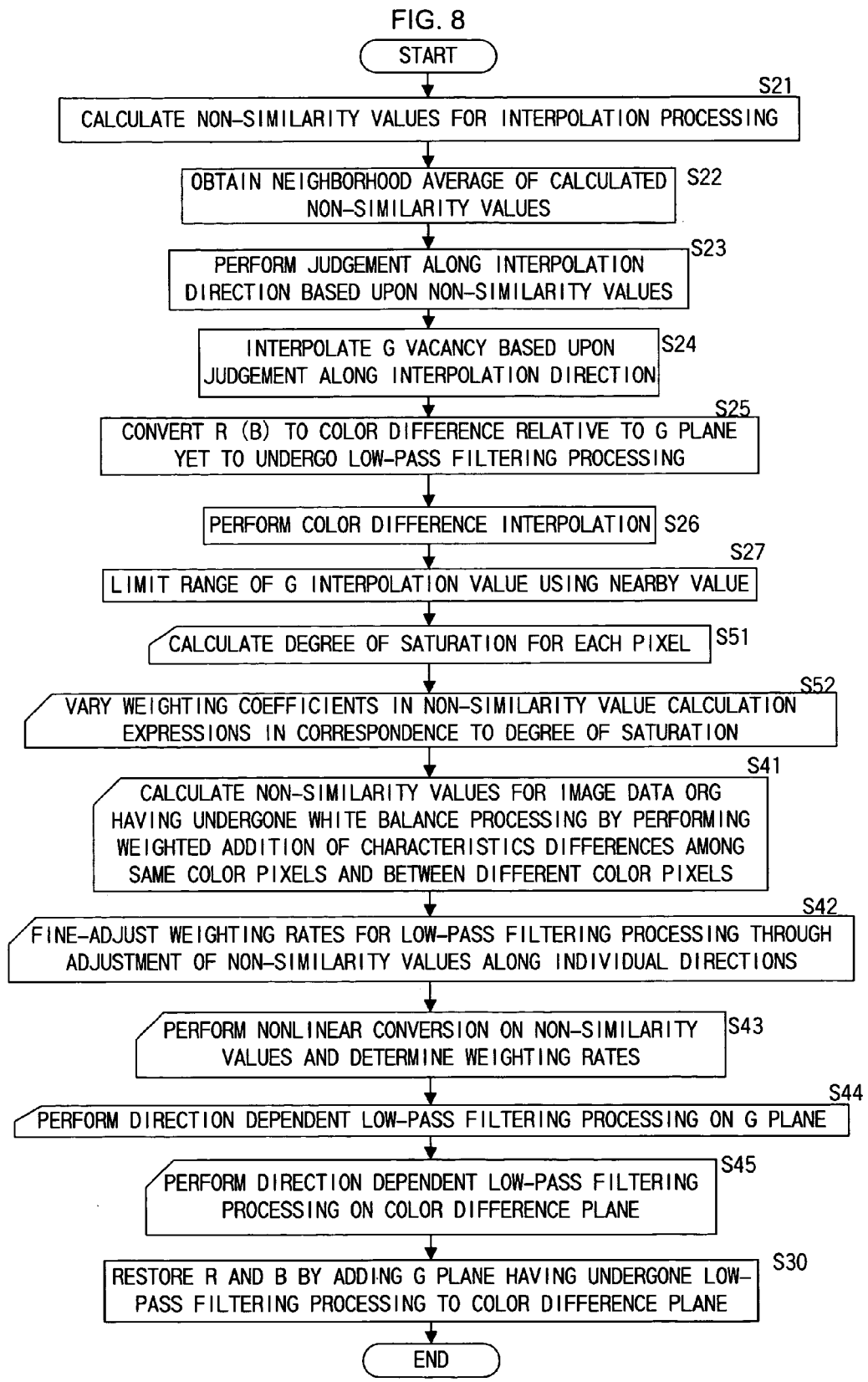

IMAGE PROCESSING METHOD FOR DIRECTION DEPENDENT LOW PASS FILTERING

BACKGROUND OF THE INVENTION

1. Field of the Invention

The present invention relates to an image processing method that may be adopted to perform low-pass filtering processing on image data obtained by performing an image capturing operation at an image capturing element in a digital still camera or the like. The present invention also relates to a recording medium that stores an image processing program utilized to implement the image processing method on a computer and a data signal used to transmit the image processing program via a transmission line. Furthermore, the present invention relates to an image capturing apparatus and an electronic camera that executes the image processing method.

2. Description of the Related Art

In the known art, noise in image data is usually removed by performing low-pass filtering processing of the image data. However, while a noise removal effect is achieved through normal isotopic filtering processing, i.e., through filtering processing performed uniformly over the entire image plane, the original high-definition structure of the image data becomes lost.

SUMMARY OF THE INVENTION

An object of the present invention is to provide an image processing technology that enables low-pass filtering processing to be performed on image data without losing the fine structure of the image.

Another object of the present invention is to provide an image processing technology that makes it possible to remove jaggies (steps occurring at inclined edges or the like) which have been difficult to remove in the prior art.

The present invention is adopted in an image processing method, through which low-pass filtering is performed on image data, comprising a similarity judging step in which degrees of similarity among pixels are judged along at least four directions in a local area containing a target pixel, i.e., a pixel undergoing low-pass filtering processing and a direction-dependent low-pass filtering step in which a pixel value for the target pixel is obtained by performing weighted averaging of the pixel values of pixels around the target pixel by increasing the weighting rates along directions manifesting a marked similarity based upon the results the judgement made in the similarity judging step and adding them to the pixel value of the target pixel, to achieve the objects described above.

In the image processing method described above, pixel lines are set along at least four directions (e.g., "vertical", "horizontal", "upward diagonal" and "downward diagonal") in the local area containing the target pixel. Differences in characteristics among the pixels (level difference, hue difference, saturation difference and the like) for the individual pixel lines are detected to judge the pixel similarity values along the individual directions. Next, a weighted averaging operation is performed. In the weighted averaging operation, weighted pixel values of the pixels around the target pixel are added to the pixel value of the target pixel and the result of addition is divided by the sum of the weights, a weighting rate along a direction manifesting a marked pixel similarity becoming increased.

As a result, since weighted averaging is performed at a low weighting rate (including zero) along directions manifesting only a small degree of pixel similarity, the image structure of the target pixel is not compromised to a significant degree. In addition, since weighted averaging is performed at a high weighting rate along directions manifesting a high degree of pixel similarity, slight structure (such as noise) at the target pixel can be effectively suppressed.

It is desirable to judge similarity by using either one or both of the characteristics differences in (1) and (2) below in the similarity judging step.

(1) Characteristics differences among a plurality of pixels located on lines passing through the target pixel along specific directions.

(2) Characteristics differences among a plurality of pixels located on lines passing near the target pixel along specific directions.

(1) and (2) are explained individually below.

Similarity Judgment Implemented by Using Only the Characteristics Differences in (1) Above.

It is judged that the similarity between the target pixel and nearby pixels (hereafter referred to as "similarity on a central line") is high if the characteristics differences in (1) are small.

When the weighting rates are determined based upon the degrees of similarity on the central lines in this manner, slight structure of the target pixel (i.e., noise) can be rigorously suppressed while sustaining the image structure (such as the edge structure) of the target pixel in a reliable manner.

Similarity Judgment Implemented by Using Only Characteristics Differences in (2) Above It is judged that the degree of similarity between nearby pixels (hereafter referred to as "similarity on an adjacent line") is high on a line adjacent to the target pixel if the characteristics differences in (2) above are small. When the weighting rates are determined based upon the degrees of similarity on such adjacent lines, jaggies can be removed effectively, as shown in FIGS. 3A~3E, to be explained in reference to an embodiment later. The following is an explanation of how such advantages are achieved.

Normally, noticeable jaggies occur on an inclined edge or on the boundaries of an inclined line. The continuity is markedly interrupted at a pixel manifesting such a step in relation to nearby pixels. Thus, the characteristics differences among the pixel manifesting the step and the surrounding pixels (for the characteristics differences in (1) above) become large and, as a result, it is rather difficult to distinguish the image structure of the pixel at which jaggies have occurred from the original one even when characteristics differences among the pixel manifesting the step and the surrounding pixels are detected.

Accordingly, attention is paid to adjacent lines adjacent to a range (location) at which the jaggies have occurred and extending in various directions. Among these adjacent lines, an adjacent line extending almost parallel to the boundary of an inclined line or an inclined edge (hereafter referred to as an "adjacent line along an inclining direction") passes through the inside (or the outside) of the boundary of the inclined line or the inclined edge within a local area. On the inside of such a boundary, which is not greatly affected by jaggies directly on the boundary and does not manifest a great difference in the density of the image structure, good pixel continuity is sustained. As a result, the characteristics differences among pixels are small on an adjacent line extending along the inclining direction, and the similarity along the inclining direction is judged to be high.

However, since an adjacent line extending along the direction other than the inclining direction intersects the boundary line with the inclined edge or the inclined line or extends directly astride the position at which the jaggies have occurred, the pixel continuity is interrupted noticeably. For this reason, great characteristics differences occur between pixels on an adjacent line extending along a direction other than the inclining direction. As a result, it is judged that the pixel similarity is low in an adjacent line extending along a direction other than the inclining direction.

In conformance to the results of a judgment made with regard to pixel similarity in this manner, the weighting rate along the inclining direction is set especially high. As a result, the pixel value is smoothed along the inclining direction for a pixel at which steps have occurred to reduce jaggies. Through such a smoothing operation implemented along the inclining direction, the image structure of the inclined edge or the inclined line can be sustained (any line disrupted by jaggies is repaired).

Thus, through the similarity judgement implemented by using the characteristics differences in (2) above, any jaggies in an image can be effectively removed and an image structure that has been disrupted by the jaggies can be repaired.

Similarity Judgment Implemented by Using Characteristics Differences in Both (1) and (2)

In this case, the degrees to which the characteristics differences in (1) and (2) are to be reflected in the similarity judgement can be adjusted as appropriate. As a result, by appropriately adjusting the effects of (1) and (2) described above, the noise in the image and the jaggies in the image can be removed in a well-balanced manner.

When calculating the characteristics differences among the pixels as the absolute values of the differences among the pixel values of the plurality of pixels in the local area, similarity is judged as explained below in the similarity judging step.

First similarity values tt1, yy1, nu1 and ns1 along at least four directions are calculated by using the absolute values of the differences in either (1) or (2) or the absolute values of the differences in both (1) and (2). The smaller the first similarity value, the higher the degree of similarity between the pixels, and the larger the first similarity value, the lower the degree of similarity between the pixels. Next, by averaging or taking the median of the first similarity values tt1, yy1, nu1 and ns1 along at least four directions, a representative value m1 of the first similarity values is calculated. Then, based upon the first similarity values tt1, yy1, nu1 and ns1 along at least four directions and the representative value m1, the following nonlinear conversion is executed to calculate second similarity values tt2, yy2, nu2 and ns2.

$$tt2 = \max\{m1-tt1+\delta, \gamma\} \quad \text{(expression 1)}$$

$$yy2 = \max\{m1-yy1+\delta, \gamma\} \quad \text{(expression 2)}$$

$$nu2 = \max\{m1-nu1+\delta, \gamma\} \quad \text{(expression 3)}$$

$$ns2 = \max\{m1-ns1+\delta, \gamma\} \quad \text{(expression 4)}$$

($\delta$ and $\gamma$ in the expressions above are each a predetermined of value which may be 0)

The larger the second similarity value, the higher the degree of similarity between the pixels, and the smaller the second similarity value, the lower the degree of similarity between the pixels. By using the second similarity values thus calculated, direction-dependent low-pass filtering may be implemented as described below.

In correspondence to the calculated second similarity values tt2, yy2, nu2 and ns2, the weighting rates for nearby pixels positioned along at least four directions are determined and the weighted pixel values of the nearby pixels around the target pixel, which correspond to the weighting rates thus determined are added to the pixel value of the target pixel and the result of addition is divided by the sum of the weights for weighted averaging.

The following is an explanation of features (A) and (B) of the nonlinear conversion expressed in (expressions 1~4).

(A) It is a relative conversion based upon the representative value m1

The representative value m1 is determined as an average of the first similarity values for each target pixel (a normal average value obtained by arithmetic means, an average of squares, a median or a value obtained through another averaging method). In (expressions 1~4), the differences between the representative value m1 and the respective first similarity values tt1, yy1, nu1 and ns1 are calculated in the first comparison terms in the max operations. These differences are relative to the representative value m1. In order to simplify the explanation, the case in which $\delta=0$ and $\gamma=0$ in (expressions 1~4) is considered. When the degree of similarity between the pixels along a given direction is much higher than the degrees of similarity along the other directions, i.e., when the first similarity value along the given direction is small and the first similarity values along the other directions are large, the representative value m1 assumes an intermediate value among the first similarity values, and while the second similarity value determined in correspondence to the difference along the direction in which the degree of similarity is much higher is positive and the differences along the other directions are negative, 0 is assumed for the second similarity values along the other directions through comparison with 0.

Thus, unlike in a method which uses the reciprocal of the first similarity value as the second similarity value, if 0 is taken as the second similarity value along a direction of pixel arrangement in which the degree of similarity is lower than a specific threshold value, it is possible to set the contribution factor along the direction at 0.

It is to be noted that a case in which $\delta=0$ and $\gamma=0$ is described above in order to simplify the explanation. However, by using appropriate numerical values for $\delta$ and $\gamma$, the freedom in varying the threshold value for setting the second similarity value to 0 can be afforded to increase the degree of freedom with regard to the algorithm for optimizing the similarity judgement.

(B) Namely, nonlinear conversion (limiter) is implemented by using the threshold value $(m1+\delta-\gamma)$ as the upper limit.

When a first similarity value exceeds the threshold value $(m1+\delta-\gamma)$, the first comparison term in the max operation becomes smaller than $\gamma$. In this case, the results of calculation through (expressions 1~4) are limited by the value of $\gamma$. Consequently, the degree to which a "first similarity value equal to or exceeding the threshold value" that appears to be attributable to the image structure or the like is reflected in the weighting rate can be limited at $\gamma$.

Preferably, the value of $\gamma$ should be set at 0 to set the weighting rate along the direction in which the degree of similarity is particularly low apparently due to the image structure to 0. In this case, the contribution factor along the direction in which the degree of similarity is low is excluded and low-pass filtering is performed only along the directions manifesting a high degree of similarity, to sustain the image structure reliably.

In addition, setting a negative value for y results in high pass filtering processing (a negative value set for the weighting rate) being performed along a direction manifesting a low degree of similarity apparently due to the image structure, so that the image contrast is emphasized along the direction.

As explained in (A) and (B) above, by implementing the nonlinear conversion as expressed in (expressions 1–4), the weighting rates in the low-pass filtering processing can be determined with a higher degree of suitability.

If the image data are color image data, a similarity judgement can also be performed based upon one type of color information in the color image data. In such a case, a calculation scale can be decreased. Furthermore, if a similarity judgement is performed based upon two types of color information, it is possible to make an accurate judgement with regard to a color boundary at which no difference may manifest based upon one type of color information, to execute correct direction-dependent low-pass filtering processing. In other words, it becomes possible to make an accurate judgement with regard to a location at which it is difficult to judge the image structure, such as a color boundary having a uniform brightness level (uniform luminance values). In addition, noise and jaggies can be minimized while fully preserving a color boundary with uniform luminance values and the like.

In image processing through which a similarity judgment is performed based upon at least two types of color information in the color image data, the color image data which have not yet undergone interpolation processing may be used in the similarity judging step, to eliminate any risk of making an erroneous judgment on the directionality of the image structure on account of a color artifact component or the like that may manifest after the interpolation processing. In addition, since the similarity judgement can be performed using the information prior to the G full surface interpolation, a scale of the processing can be reduced.

Furthermore, in the image processing through which a similarity judgement is performed based upon at least two types of color information in the color image data, the first similarity value along a specific direction may be calculated by using the characteristics differences among a plurality of same color pixels and/or among a plurality of different color pixels along the specific direction to make a judgment with regard to the degree of similarity in correspondence to the calculated first similarity value.

The following is an explanation of the different situations.

First Similarity Values Calculated by Using Characteristics Differences Among Same Color Pixels Alone Since the characteristics differences among same color pixels are used, the directionality of the image structure can be determined with accuracy in a local area manifesting a high degree of saturation.

First Similarity Values Calculated by Using Characteristics Differences Among Different Color Pixels Alone Since the characteristics differences among the pixels that are closest to each other can be obtained, the directionality of an even finer image structure can be determined. However, it should be kept in mind that this method may not yield accurate results with regard to the degree of similarity in a local area manifesting a high degree of saturation.

First Similarity Values Calculated by Using Characteristics Differences Among Same Color Pixels and Between Different Color Pixels In this case, the degrees to which the two types of characteristics differences are reflected in the similarity judgement can be adjusted as appropriate. As a result, the directionality of the image structure can be determined in an optimal manner by combining the advantages of the two methods described above.

When calculating the characteristics differences among different color pixels, color image data having undergone white balance processing may be used. By performing white balance processing on color image data, an extreme color bias in the color image data is prevented from occurring. Thus, the risk of color bias manifesting as a characteristics differences is reduced to enable an accurate judgment with regard to the directionality of the image structure.

In addition, when calculating characteristics differences among different color pixels, the saturation of the target pixel undergoing low-pass filtering processing may be detected and the contribution factor of the characteristics differences among a plurality of a different color pixels may be varied in correspondence to the detected saturation in the similarity judging step. Generally speaking, large characteristics differences among different color pixels at a location manifesting an extremely high degree of saturation tends to be erroneously judged to be the directionality of the image structure. Thus, by varying the contribution factor of the characteristics differences among different color pixels in correspondence to the degree of saturation, the directionality of the image structure can be determined with a higher degree of accuracy.

When performing image processing on image data having undergone interpolation processing on pixels that have missing color components, low-pass filtering processing is performed only on pixels having undergone the interpolation processing in the direction-dependent low-pass filtering step.

Under normal circumstances, color artifact or jaggies attributable to interpolation processing may occur. The image processing method according to the present invention is effective in reducing such color artifact and jaggies. Accordingly, the low-pass filtering processing according to the present invention is specifically implemented on the pixels that have undergone the interpolation processing and thus are likely to manifest color artifact or jaggies. As a result, color artifact and jaggies attributable to the interpolation processing can be reduced with a high degree of reliability.

Pixels that have not been interpolated, on the other hand, may be either subject to low-pass filtering processing or not.

When performing image processing of the image data that have undergone interpolation processing on pixels having missing color components, it is desirable to limit the pixel value of each pixel that has undergone interpolation processing at a cutoff value corresponding to the largest pixel value or the smallest pixel value in a specific area near the pixel having undergone interpolation processing prior to the low-pass filtering processing in the similarity judging step.

A peak may form at an interpolated pixel in a special type of interpolation processing. Such a peak at the interpolated pixel is limited prior to the low-pass filtering processing. As a result, the peak at the interpolated pixel is prevented from spreading to nearby pixels through the low-pass filtering processing to achieve an improvement in the image quality.

When performing image processing on color image data having, at least, a first color with a highest pixel density and a second color with a low pixel density and vacancies of color component, the image processing procedure comprises a color difference calculating step in which the color difference between the second color and the first color is obtained for each pixel at which the second color is present, a color difference interpolating step in which a color difference interpolation value is obtained for a pixel at which the second color is not present based upon the color difference obtained in the color difference calculating step and a second color restoring step in which the second color is restored based upon the color difference interpolation value obtained in the color difference interpolating step and the first color. In this case, the first color used in the calculation of the color difference in the color difference calculating step is the first color in the image data that has not undergone the low-pass filtering processing.

In the image processing method described above in which the first color in the image data that has not undergone the low-pass filtering processing is used to calculate the color differences, the color differences are obtained by using a large volume of information available prior to the low-pass filtering processing and interpolation processing can be implemented to obtain data as close to those for the original image as possible based upon the color differences obtained by using the large volume of information.

It is desirable to use the first color in the image data having undergone the low-pass filtering processing for the restoration of the second color in the second color restoring step. Through the low-pass filtering processing, noise and jaggies in the first color have been suppressed to a sufficient degree. By adding the first color having undergone the low-pass filtering processing to the color difference after the interpolation processing (or by multiplying the color difference by the first color) the second color is generated. In this case, noise and jaggies spreading to the second color via the first color are reduced so that the subsequent image processing (such as low-pass filtering processing) on the second color can be omitted or can be performed only to a lesser degree.

In image processing performed on color image data having, at least, a first color with the highest pixel density and a second color with a low pixel density and vacancies of color component, weighting rates are obtained using the first color and weighted averaging on the second color or color difference are performed using the weighting rates in the direction-dependent low-pass filtering step. Since the first color achieves the highest pixel density, the weighting rates ascertained in conformance to the first color reflect structures in the image with the highest degree of accuracy. By using such weighting rates while performing low-pass filtering processing of the second color (or the color difference), accurate low-pass filtering processing is implemented on the second color. In addition, in such a case, the weighting rates obtained for the first color low-pass filtering processing can be utilized. Thus, no weighting rates need to be calculated specifically for the second color to achieve a reduction in the length of time required for the image processing.

In the direction-dependent low-pass filtering step, the weighting rate along, at least, the direction in which the degree of similarity is the lowest can be set essentially to 0.

By setting the weighting rate along the direction manifesting the least similarity essentially to 0, the image structure along the direction can be preserved in a reliable manner and disintegration of the image, which may otherwise occur during low-pass filtering processing, can be reliably prevented.

When performing image processing on image data generated by performing color separation on reflected light originating from the object of image capturing with color filters arranged in a Bayer array, a judgment is made on the similarity manifesting in original image data constituted of color separated R, G and B pixel data (referred to as original image data), G color image data generated by using the original image data or luminance data generated from the original image data in the similarity judging step. In this case, in the low-pass filtering step, low-pass filtering is implemented on the G color image data generated from the original image data, R color image data generated from the original image data, B color image data generated from the original image data, the luminance data generated from the original image data or color differences between individual RGB colors image data generated from the original image data, based upon the similarity ascertained in the similarity judging step.

The present invention may also be adopted in an image capturing apparatus and an electronic camera that implements, at least, low-pass filtering on image data. The image processing apparatus and the electronic camera comprise a means for similarity judgment that judges degrees of similarity between pixels along at least four directions in a local area containing a target pixel undergoing low-pass filtering processing and a means for direction-dependent low-pass filtering that performs weighted averaging in which weighted pixel values of the pixels around the target pixel are added to the pixel value of the target pixel and the result of addition is divided by the sum of the weights, the weighting rate along a direction manifesting a high degree of similarity becoming increased based upon the results of the judgment performed by the means for similarity judgment.

The present invention may also be adopted in a recording medium that records an image processing program for implementing, at least, low-pass filtering on image data. Moreover, the present invention may be adopted in a data signal used to transmit the image processing program via a transmission line. The recording medium according to the present invention may be a recording medium (e.g., a memory card) that is detachably mounted at the portable information apparatus such as an electronic camera. In such a case, the portable information apparatus reads out and then executes the image processing program stored in the recording medium mounted at the apparatus.

BRIEF DESCRIPTION OF THE DRAWINGS

FIG. 1 shows the image processing program in a first embodiment;

FIG. 2 illustrates the calculation process performed to obtain first similarity values;

FIG. 7 is a flowchart of an image processing operation performed in the electronic camera; and FIG. 8 is a flowchart of an image processing operation performed in the electronic camera.

DESCRIPTION OF THE PREFERRED EMBODIMENTS

Figure 3A:
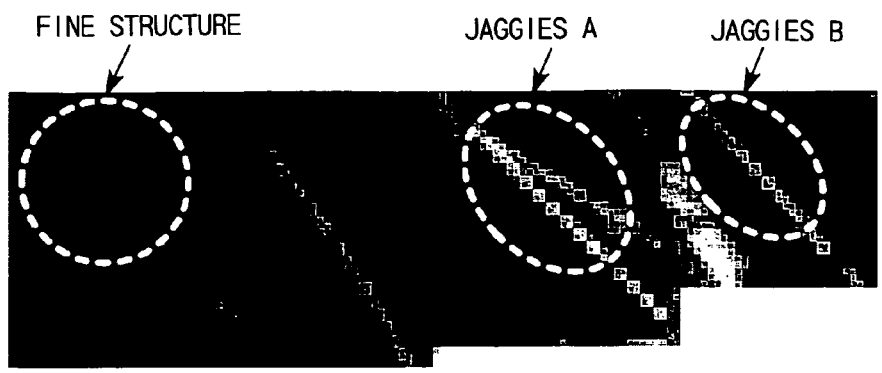
FIG. 3 presents photographs of halftone images on the display.

The following is an explanation of the preferred embodiments of the invention given in reference to the drawings.

First Embodiment

The image processing method in the first embodiment is implemented by executing an image processing program on a computer. If the image processing program is recorded in a recording medium such as a CD-ROM, the image processing program is copied onto a hard disk at the computer from the recording medium set at the computer for use. Alternatively, the image processing program may be downloaded onto the hard disk at the computer via a communication network such as the Internet for use.

FIG. 1 is a flowchart of the operating procedure of this image processing program. The following is an explanation of the operation performed in the image processing in the first embodiment given in reference to the operating procedure shown in FIG. 1. First, the computer reads out an image file to undergo the processing, and opens and stores the image data to undergo the processing in memory (step S1). The image processing is performed on single-color image data opened in the memory in this manner. The single-color image data include image data corresponding to each color in a color image and luminance data synthesized from a plurality of colors. The computer selects a target pixel FG[i, j] to undergo the processing located at an ith row and a jth column in the image data and sets a local area ranging over approximately five rows and five columns around the target pixel (step S2). The image data to undergo the processing are image data corresponding to a plurality of pixels over n rows and m columns, and data corresponding to each pixel have a signal level referred to as a pixel value. Thus, the term "pixel level" refers to the signal level representing the pixel value. It is to be noted that the term "target pixel" does not specifically refer to an actual pixel at the image capturing element.

The computer performs a calculation using the expressions below based upon the level differences among the pixels within the local area mentioned above, and obtains first similarity values tt1, yy1, nu1 and ns1 along four directions (vertical, horizontal, upward diagonal and downward diagonal) (step S3). It is to be noted that the vertical direction refers to the direction along which the columns of image data provided over n rows and m columns extend and the horizontal direction refers to the direction in which the rows of the image data provided over n rows and m columns extend.

First similarity value tt1 along the vertical direction:

$$tt1 = a \times (|FG[i, j]-FG[i, j-1]|+|FG[i, j]-FG[i, j+1]|)+$$

$$b \times (|FG[i, j+1]-FG[i, j-1]|+|FG[i-1, j]-FG[i-1, j+2]|+$$

$$|FG[i-1, j]-FG[i-1, j-2]|)+$$

$$c \times (|FG[i, j+1]-FG[i, j-1]|+|FG[i+1, j]-FG[i+1, j+2]|+$$

$$|FG[i+1, j]-FG[i+1, j-2]|) \qquad \text{(expression 5)}$$

First similarity value yy1 along the horizontal direction:

$$tt1 = a \times (|FG[i, j]-FG[i-1, j]|+|FG[i, j]-FG[i+1, j]|)+$$

$$b \times (|FG[i+1, j]\ FG[i-1, j]|+|FG[i, j-1]-FG[i+1, j-1]|+$$

$$|FG[i, j-1]-FG[i-2, j-1]|)+$$

$$c \times (|FG[30\ 1, j]-FG[i-1, j]|+|FG[i, j+1]-FG[i+2, j+1]|+$$

$$|FG[i, j+1]-FG[i-2, j+1]|) \qquad \text{(expression 6)}$$

First similarity value nu1 along the upward diagonal direction:

$$nu1 = a \times (|FG[i, j]-FG[i+1, j-1]|+$$

$$|FG[i, j]-FG[i-1, j+1]|)+$$

$$b \times (|FG[i-2, j+1]-|FG[i-1, j]|+$$

$$|FG[i-1, j]-FG[i, j-1]|+$$

$$c \times (|FG[i-1, j+2]-FG[i, j+1]|+|FG[i, j+1]-$$

$$FG[i+1, j]|+|FG[i+1, j]-FG[i+2, j-1]|) \qquad \text{(expression 7)}$$

First similarity value ns1 along the downward diagonal direction:

$$ns1 = a \times (|FG[i, j]-FG[i-1, j-1]|+$$

$$|FG[i, j]-FG[i+1, j+1]|)+$$

$$b \times (|FG[i-2, j-1]-FG[i-1, j]|+|FG[i-1, j]-$$

$$FG[i, j+1]|+|FG[i, j+1]-FG[i+1, j+2]|)+$$

$$c \times (|FG[i-1, j-2]-FG[i, j-1]|+$$

$$|FG[i, j-1]-FG[i+1, j]|+$$

$$|FG[i+1, j]-FG[i+2, j+1]|) \qquad \text{(expression 8)}$$

FIGS. 2A–2D respectively illustrate the operation expressions in (expressions 5~8) above. In FIGS. 2A–2D, each two-ended arrow indicates the position of the pixel to undergo a level difference calculation and a or b on the arrow indicates a level difference proportional constant. It is to be noted that the term of a proportional constant c which is not shown, is at a position that achieves a symmetrical relationship with the term of the proportional constant b relative to the target pixel.

The computer performs the following averaging operation on the first similarity values along the four directions to calculate a representative value m1 (step S4).

$$m1 = (tt1+yy1+nu1+ns1)/4 \qquad \text{(expression 9)}$$

Next, the computer performs the following nonlinear conversion based upon the first similarity values tt1, yy1, nu1 and ns1 along the four directions and the representative value m1 to calculate second similarity values tt2, yy2, nu2 and ns2 along the four directions (step S5).

$$tt2 = \max\{m1-tt1+\delta, \gamma\} \qquad \text{(expression 10)}$$

$$yy2 = \max\{m1-yy1+\delta, \gamma\} \qquad \text{(expression 11)}$$

$$n2 = \max\{m1-nu1+\delta, \gamma\} \qquad \text{(expression 12)}$$

$$ns2 = \max\{m1-ns1+\delta, \gamma\} \qquad \text{(expression 13)}$$

with $\delta=0$ and $\gamma=0$, for instance.

As (expressions 5~8) indicate, the absolute value of the difference between the pixel values being compared is defined as a first similarity value, and consequently, the smaller the first similarity value, the higher the degree of similarity between the pixels and the larger the first similarity value, the lower the degree of similarity between the pixels. Thus, the first similarity value might be referred to as a non-similarity value instead. In contrast, as (expressions 10~13) indicate, the difference between the representative value of the first similarity values and the corresponding first similarity values is defined as a second similarity value and consequently, the larger the second similarity value, the higher the degree of similarity between the pixels and the smaller the second similarity value, the lower the degree of similarity between the pixels. Thus, the second similarity value indicates the degree of similarity.

It is to be noted that the degree of similarity between individual sets of pixel data may be judged by multiplying the pixel values of the plurality of pixels. In such a case, the larger the value resulting from the multiplication, the higher the degree of similarity.

The computer normalizes the second similarity values tt2, yy2, nu2 and ns2 along the four directions to obtain weighting rates tt, yy, nu and ns along the four directions (step S6).

$$m2=tt2+yy2+nu2+ns2 \quad \text{(expression 14)}$$

$$tt=tt2/m2 \quad \text{(expression 15)}$$

$$yy=yy2/m2 \quad \text{(expression 16)}$$

$$nu=nu2/m2 \quad \text{(expression 17)}$$

$$ns=ns2/m2 \quad \text{(expression 18)}$$

The computer performs weighted averaging in which the weighted pixel values of neighboring pixels are added to the pixel value of the target pixel FG[i, j] and the result of addition is divided by the sum of the weights to calculate a target pixel G[i, j] having undergone the low-pass filtering processing through (expression 19) (step S7).

$$g[i, j]=\{FG[i, j]+$$

$$k \times tt(FG[i, j-1]+(FG[i, j+1])+$$

$$k \times yy(FG[i-1, j]+(FG[i+1, j])+$$

$$k \times nu(FG[i-1, j+1]+(FG[i+1, j-1])+$$

$$k \times ns(FG[i-1, j-1]+(FG[i+1, j+1])\}/(1+k \times 2) \quad \text{(expression 19)}$$

With k representing a constant value used to adjust the extent of the low-pass filtering processing, which may be, for instance, ½.

The computer records the pixel G[i, j] having undergone the low-pass filtering processing in a memory area for recording the low-pass filtering processing results provided in the memory (step S8). At this point, the computer makes a decision as to whether or not the low-pass filtering processing has been completed for all the pixels (step S9). If it is decided that the low-pass filtering processing has not been completed (step S9 NO), the computer selects a new target pixel in the image data (step S10) and the operation returns to step S2 explained earlier. If, on the other hand, it is decided that the low-pass filtering processing on all the pixels has been completed (step S9 YES), the computer converts the image data having undergone the low-pass filtering processing to an image file in a specific format, for instance, before ending the operation.

Figure 3B:
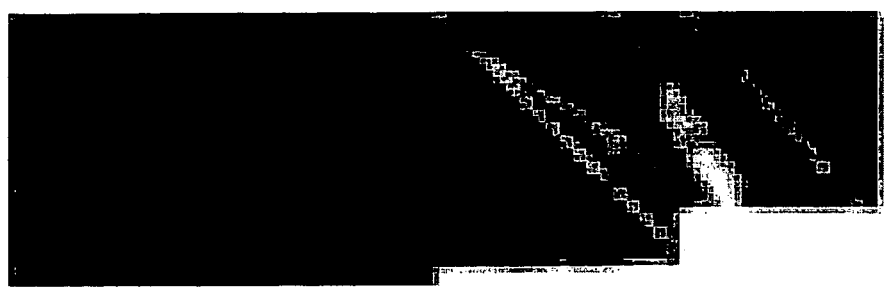

Advantages achieved by performing the image processing in the first embodiment described above are now explained in reference to FIGS. 3A~3E. FIGS. 3A~3B present photographs of halftone images on the display.

FIG. 3A shows original image data which have not yet undergone the low-pass filtering processing. It is to be noted that in the figure, the fine structure of the image and the locations at which jaggies A and B have occurred are indicated by encircling them with white dotted lines.

FIG. 3B shows image data having undergone non-direction-dependent low-pass filtering processing. It is to be noted that this low-pass filtering processing is local averaging operation processing performed by setting the weighting coefficient for the target pixel at ½ and the weighting coefficients for the surrounding 8 pixels uniformly at ¹⁄₁₆. In this case, the noise in the overall image becomes reduced. However, the definition of the image becomes lowered and there is a significant loss of the fine structure of the image. In addition, the jaggies A and B are still present and the jaggedness on the inclining lines is noticeable.

Figure 3C:
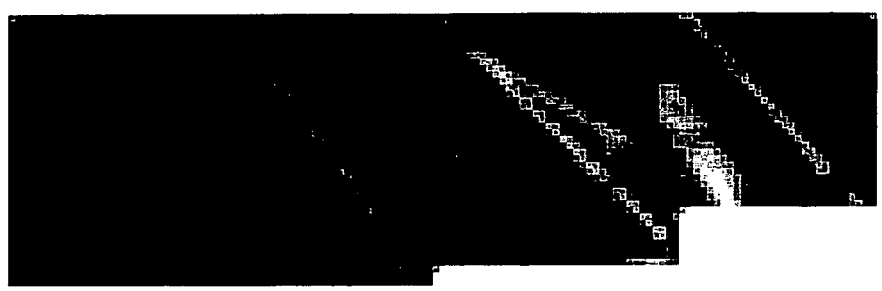

FIG. 3C shows image data having undergone the low-pass filtering processing in the embodiment performed by setting the proportional constants at a=1 and b=c=0 in the first similarity value calculating expressions (5–8). In this low-pass filtering processing, the first similarity values are calculated mainly by using the pixel level differences on the central lines Lc passing through the target pixel, as shown in FIGS. 2A~2D. Through the low-pass filtering processing, the noise in the overall image becomes reduced. In addition, the definition of the image does not become lowered and the fine structure of the image is well preserved. Furthermore, a degree of improvement is observed in the jaggies B. However, the jaggies A are still present and the steps on inclining lines are noticeable.

Figure 3D:
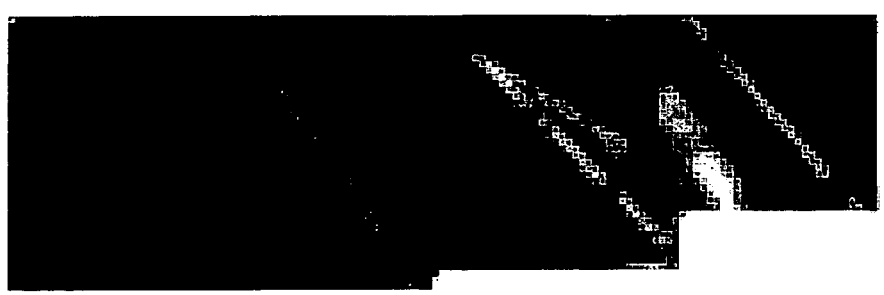

FIG. 3D shows image data having undergone the low-pass filtering processing in the embodiment performed by setting the proportional constants at b=1 and a=c=0 in the first similarity value calculation expressions (5–8). In this low-pass filtering processing, the first similarity values are calculated mainly by using the pixel level differences on adjacent lines Ln passing adjacent to the target pixel, as illustrated in FIGS. 2A~2D. Such low-pass filtering processing reduces the noise in the entire image. The definition of the image, however, becomes somewhat reduced and there is a slight loss in the fine structure of the image. A pronounced improvement is observed in the jaggies A and B, however, and the steps on the inclining lines are broken up (smoothed) in small pixel units and are much less noticeable.

Figure 3E:

FIG. 3E shows image data having undergone the low-pass filtering processing in the embodiment performed by setting the proportional constants at a=b=1 and c=0 in the first similarity value calculation expressions (5–8). In this low-pass filtering processing, the first similarity values are calculated based upon both the "pixel level differences on the central lines Lc" and the "pixel level differences on the adjacent lines Ln," as shown in FIGS. 2A~2D. Such low-pass filtering processing reduces the noise in the overall image. In addition, the definition of the overall image is not lowered and the fine structure of the image is well-preserved. Furthermore, a marked improvement is observed in the jaggies A and B and the steps on the inclining lines are smoothed in small pixel units and are much less noticeable.

While the first similarity values are calculated based upon the level differences among pixels in the first embodiment, the present invention is not limited to this example. Generally speaking, the first similarity values only need to be calculated based upon differences in the characteristics of individual pixels. For instance, when processing a color image, the first similarity values may be calculated based upon hue differences, saturation differences or the like. The first similarity values may also be calculated by extracting the differences in the characteristics in an image obtained through filtering processing performed on image data.

In addition, while the first similarity values are calculated using (expressions 5~8) in the embodiment, the present invention is not limited to this example. Under normal circumstances, central lines Lc passing through the target pixel and adjacent lines Ln extending adjacent to the target pixel are set within a local area containing the target pixel. Then, the differences in the characteristics of adjacent pixels or pixels positioned over a distance with a single pixel present between them on these lines Lc and Ln may be ascertained to calculate the first similarity values by adding these characteristics differences at a specific ratio.

For instance, the first similarity values tt1 and yy1 may be calculated using (expressions 20 and 21) below.

First similarity value tt1 along the vertical direction:

$$tt1=a\times(|FG[i, j]-FG[i, j-1]|+|FG[i, j]-FG[i, j+1]|)+$$

$$b\times(|FG[i, j-1]-FG[i-1, j+2]|+|FG[i-1, j]-FG[i-1, j-2]|)\times s+$$

$$c\times(|FG[i+1, j]-FG[i+1, j+2]|+$$

$$|FG[i+1, j]-FG[i+1, j-2]|)\times s \quad \text{(expression 20)}$$

First similarity value yy1 along the horizontal direction:

$$yy1=a\times(|FG[i, j]-FG[i-1, j]|+|FG[i, j]-FG[i+1, j]|)+$$

$$b\times(|FG[i, j-1]-FG[i+2, j-1]|+|FG[i, j-1]-FG[i-2, j-1]|)\times s+$$

$$c\times(|FG[i, j+1]-FG[i+2, j+1]|+|FG[i, j+1]-FG[i-2, j+1]|)\times s \quad \text{(expression 21)}$$

with s representing a coefficient used to make up for the smaller number of the absolute value addition terms compared to that along the diagonal directions, and which may be set at, for instance, 1~1.5.

In addition, while the second similarity values are calculated by using (expressions 9~13) in the embodiment, the present invention is not limited to this example. For instance, instead of (expressions 9~13), (expressions 101~107) below may be used to calculate the second similarity values.

$$ty=tt1-yy1 \quad \text{(expression 101)}$$

$$us=nu1-ns1 \quad \text{(expression 102)}$$

$$tt2=\max\{-ty, 0\} \quad \text{(expression 103)}$$

$$yy2=\max\{ty, 0\} \quad \text{(expression 104)}$$

$$nu2=\max\{-us, 0\} \quad \text{(expression 105)}$$

$$ns2=\max\{us, 0\} \quad \text{(expression 106)}$$

if tt2+yy2+nu2+ns2=0 then tt2=1, yy2=1, nu2=1, ns2=1 (expression 107)

In (expressions 101~106), the following two types of processing 1 and 2, which are independent of each other, are performed at once:

1. The weighting rate in the direction-dependent low-pass filtering processing is set substantially to 0 for the direction manifesting a lesser degree of similarity in each pair of directions such as "vertical and horizontal" or "upward diagonal and downward diagonal" extending roughly perpendicular to each other.
2. The weighting rate in the direction-dependent low-pass filtering processing is determined based upon the "absolute value of the difference between the first similarity values along the two directions" for the direction manifesting a higher degree of similarity in each pair of directions such as "vertical and horizontal" or "upward diagonal and downward diagonal" extending roughly perpendicular to each other.

In the processing 1 above, low-pass filtering processing is executed only along one of the two directions extending roughly perpendicular to each other. As a result, low-pass filtering processing is not implemented along the two directions extending almost perpendicular to each other at once, thereby making it possible to sustain the directionality of the image structure with a higher degree of clarity.

In the processing 2, on the other hand, the low-pass filtering processing is implemented more rigorously along the direction manifesting the higher degree of similarity as the difference in the first similarity values along the two directions extending roughly perpendicular to each other becomes larger. As a result, it is possible to reduce noise and jaggies more thoroughly along a direction manifesting pronounced similarity.

Next, another embodiment is explained.

Second Embodiment

Figure 4:
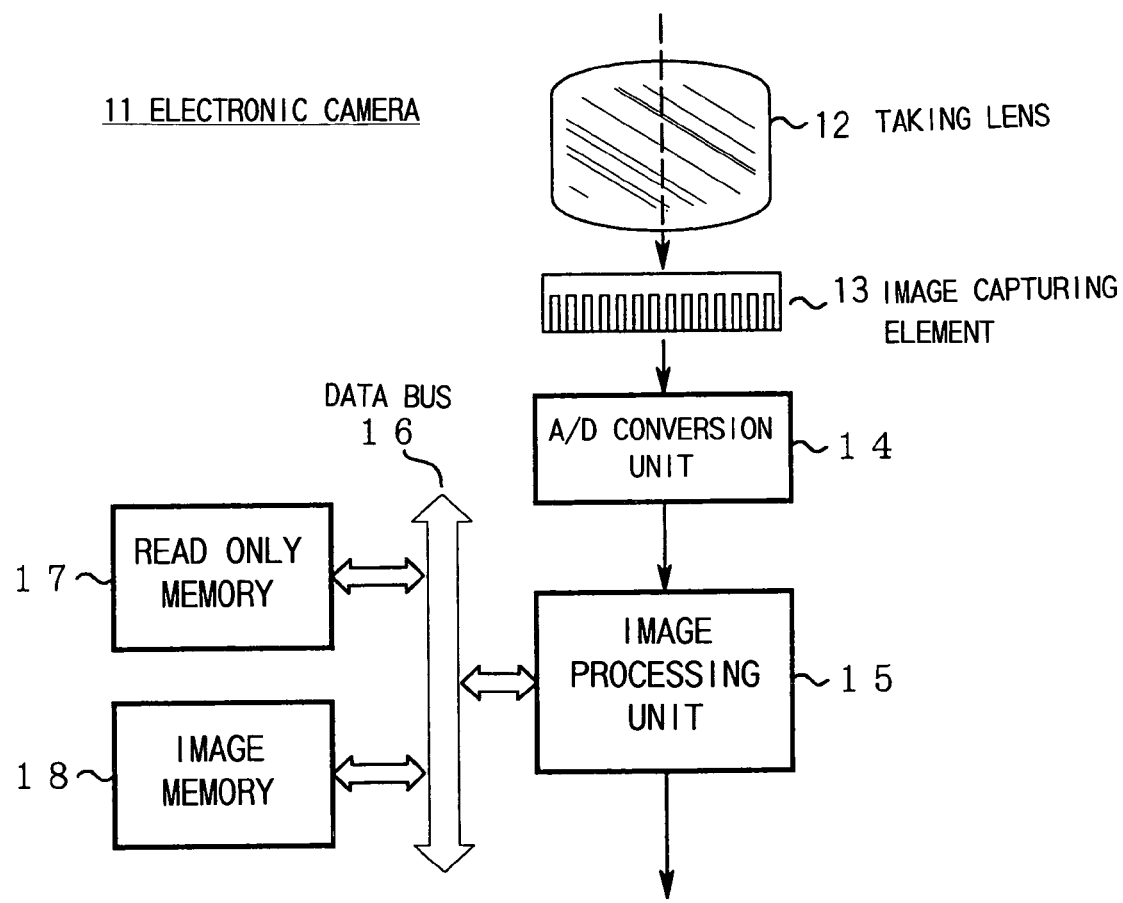
FIG. 4 is a block diagram illustrating the structure of the electronic camera 11.

The second embodiment relates to an electronic camera that processes captured images through an image processing method similar to that in the first embodiment. FIG. 4 is a block diagram illustrating the structure of an electronic camera 11 in the second embodiment.

In FIG. 4, a taking lens 12 is mounted at the electronic camera 11. A light-receiving surface of an image capturing element 13 is set in the image space of the taking lens 12. RGB image data output by the image capturing element 13 are digitized via an A/D conversion unit 14, and are then input to an image processing unit 15 constituted of a microprocessor. A read only memory 17, an image memory 18 and the like are connected to the image processing unit 15 via a data bus 16. An image processing program is recorded in the read only memory 17. The image processing unit 15 reads out and executes this image processing program.

Figure 5:
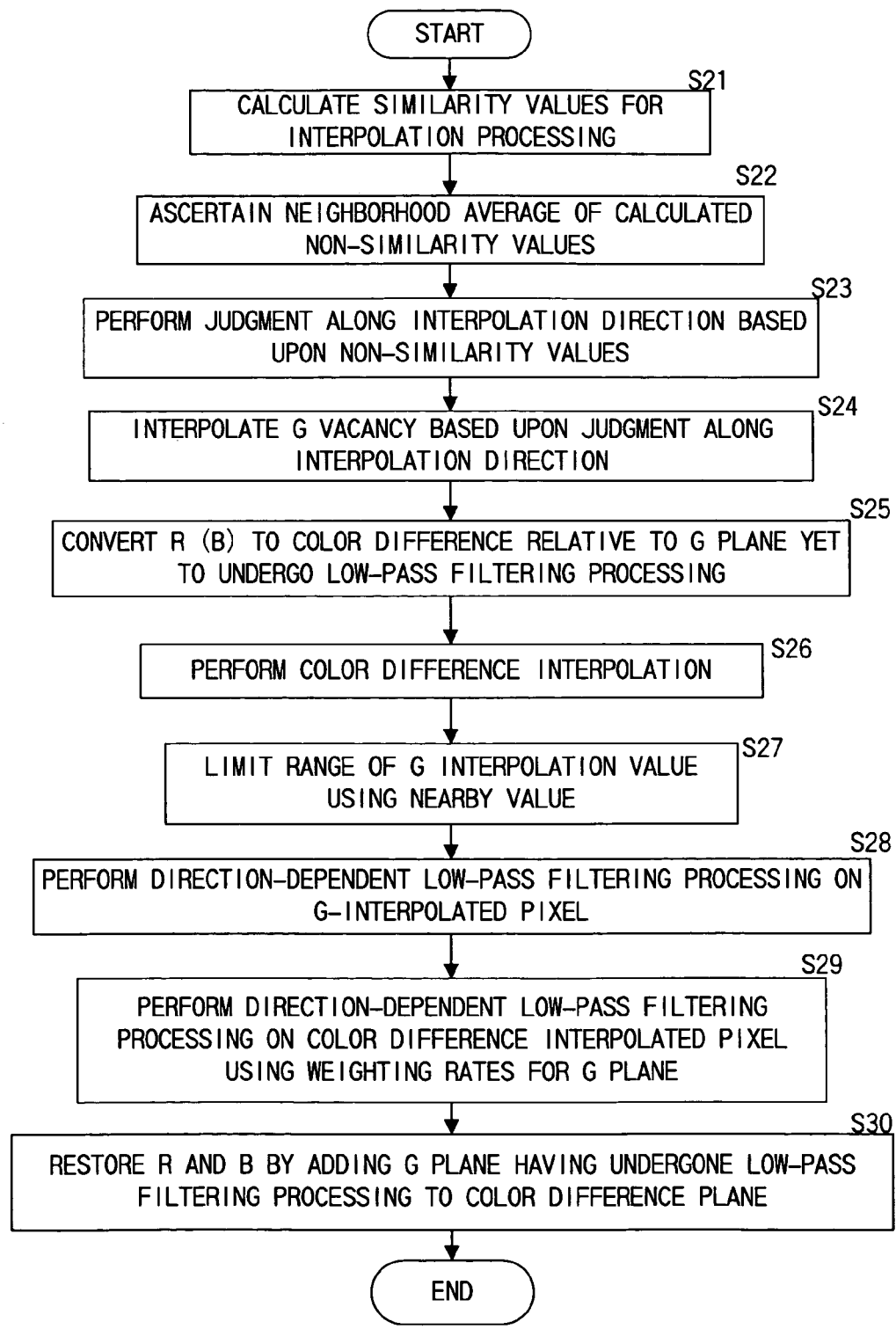
FIG. 5 is a flowchart of the image processing program in a second embodiment.
Figure 6:
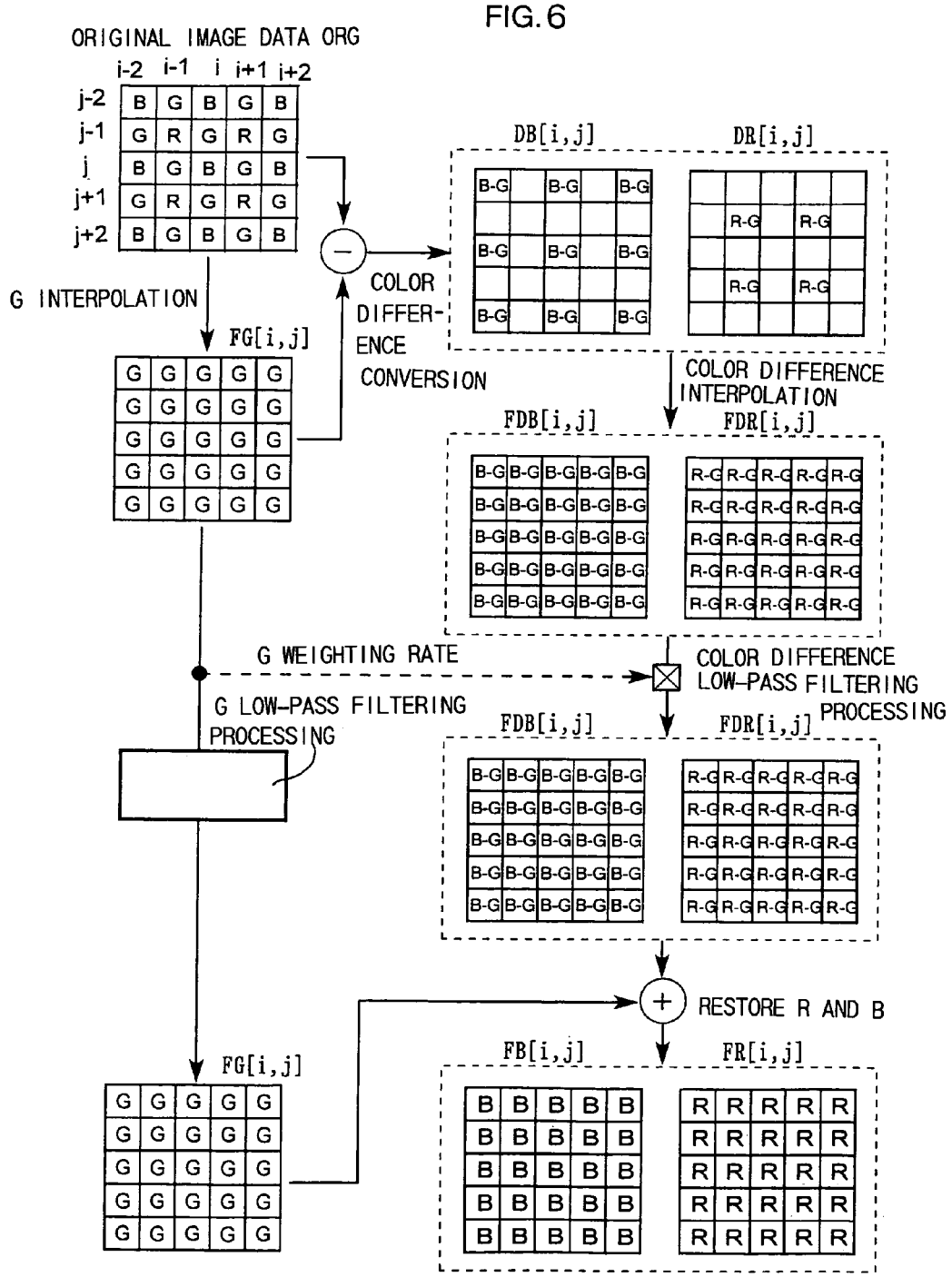
FIG. 6 illustrates the operating procedure adopted in the image processing program.

FIG. 5 is a flowchart of the operating procedure adopted in the image processing program. FIG. 6 illustrates a data flow of the image data at various stages during the image processing. The following is an explanation of the image processing operation achieved in the embodiment, given in reference to FIGS. 4~6.

Image data ORG output by the image capturing element 13 are data constituted of three colors R, G and B in a Bayer array. One of the following pixel values G ($\bigcirc,\Delta$), R ($\bigcirc,\Delta$) and B ($\bigcirc,\Delta$) is assigned to each of the pixels in the image data ORG in conformance to the rules of the Bayer array. ($\bigcirc,\Delta$) indicates the row and the column with which a given pixel position is specified.

The image processing unit 15 takes in the image data ORG and executes image processing through the following procedure. An explanation of the processing performed in individual steps follows.

Step S21: First Similarity Value Calculation for Interpolation Processing

First, the image processing unit 15 calculates a first similarity value Cv0 along the vertical direction and a first similarity value Ch0 along the horizontal direction for a pixel with no G color component, i.e., for a vacancy [i, j], through the following expressions (22~27).

$$Cv1=|G[i, j-1]-G[i, j+1]| \quad \text{(expression 22)}$$

$$Cv2=(|G[i, j-1]-Z[i, j]|+|G[i, j+1]-Z[i, j]|=1)/2 \quad \text{(expression 23)}$$

$$Ch1|G[i-1, j]-G[i+1, j]| \quad \text{(expression 24)}$$

$$Ch2=(|G[i-1, j]-Z[i, j]|+|G[i+1, j]-Z[i, j]|)/2 \quad \text{(expression 25)}$$

$$Cv0[i, j]=A1 \cdot Cv1+A2 \cdot Cv2 \quad \text{(expression 26)}$$

$$Ch0[i, j]=A1 \cdot Ch1+A2 \cdot Ch2 \quad \text{(expression 27)}$$

The value corresponding to either R or B is used for Z. A1 and A2 each represent a weighting coefficient, with at least either one of the weighting coefficients being a value other than 0. Typically, A1=A2=1.

Step S22: First Similarity Value Smoothing Processing

Next, the image processing unit 15 calculates first similarity values Cv and Ch by calculating neighborhood averages for the first similarity values Cv0 and Ch0 through the following expressions (28 and 29)

$$Cv[i, j]=(4 \cdot Cv9[i, j]+Cv0[i-1, j-1]+Cv0[i+1, j-1]+$$

$$Cv0[i-1, j+1]+Cv0[i+1, j+1])/8 \quad \text{(expression 28)}$$

$$Ch[i, j]=(4 \cdot Ch0i, j]+Ch0[i-1, j-1]+Ch0[i+1, j-1]+$$

$$Ch0[i-1, j+1]+Ch0[i+1, j+1])/8 \quad \text{(expression 29)}$$

It is to be noted that these neighborhood averages may be simplified to;

$$Cv[i, j]=Cv0[i, j]$$

$$Ch[i, j]=Ch0[i, j]$$

Step S23: Judgement of Interpolation Direction Based Upon First Similarity Values Next, the image processing unit 15 sets a direction flag HV in conformance to the results of the following conditional judgement:

Vertical similarity judgment: $HV[i, j]=1$ if $Cv[i, j]+th0<Ch[i, j]$

Horizontal similarity judgment: $HV[i, j]=-1$ if $Ch[i, j]+th0<Cv[i, j]$

Non-directionality judgment: $HV[i, j]=0$ in all cases other than the above th0 is a threshold within a range of approximately 0 ~several tens if the range that may be assumed for G([i, j] is, for instance, 0~255.

Step S24: G Interpolation Operation

The image processing unit 15 executes the following interpolation operation in conformance to the setting at the direction flag HV.

A pixel with a G component, i.e., in the case of no vacancy: $FG[i, j]=G[i, j]$

Vertical similarity: $FG[i, j]=Gv$ if $HV[i, j]=1$

Horizontal similarity: $FG[i, j]=Gh$ if $HV[i, j]=-1$

No directionality: $FG[i, j]=(Fv+Gh)/2$, if $HV[i, j]=0$

Gv and Gh above represent values obtained as follows:

$$Gv=(G[i, j-1]+G[i, j+1])/2+C1 \cdot (2 \cdot Z[i, j]-$$

$$Z[i, j-2]-Z[i, j+2])/4$$

$$Gh=(G[i-1, j]+G[i+1, j])/2+C1 \cdot (2 \cdot Z[i, j]-$$

$$Z[i-2, j]-Z[i+2, j])/4$$

with C1 representing a specific constant which may be 0, 1 or an intermediate value between them.

Step S25: R and B Color Difference Conversion

The image processing unit 15 executes the following color difference conversion at the position of each pixel which originally contains either the R color component or the B color component, in reference to the interpolated G.

$$DR[i, j]=R[i, j]-FG[i, j] \quad \text{(expression 30)}$$

$$DB[i, j]=B[i, j]-FG[i, j] \quad \text{(expression 31)}$$

Step S26: Color Difference Interpolation

The image processing unit 15 executes the following interpolation processing of the color difference data calculated as described above.

If there are R pixels above and below the target pixel:

$$FDR[i, j]=(DR[i, j-1]+DR[i, j+1])/2$$

If there are R pixels to the left and right of the target pixel:

$$FDR[i, j]=(DR[i-1, j]+DR[i+1, j])/2$$

If there are R pixels diagonally adjacent to the pixel undergoing processing:

$$FDR[i, j]=(DR[i-1, j-1]+DR[i-1, j+1]+$$

$$DR[i+1, j-1]+DR[i+1, j+1])/4$$

If there are B pixels above and below the target pixel:

$$FDB[i, j]=(DB[i, j-1]+DB[i, j+1])/2$$

If there are B pixels to the left and right of the target pixel:

$$FDB[i, j]=(DB[i-1, j]+DB[i+1, j])/2$$

If there are B pixels diagonally adjacent to the pixel undergoing processing:

$$FDB[i, j]+(DB[i-1, j-1]+DB[i-1, j+1]+$$

$$DB[i+1, j-1]+DB[i+1, j+1])/4$$

Step S27: Range Limitation of G Interpolation Value

The image processing unit 15 limits the range of the G interpolation value by using the largest value Gmax and the smallest value Gmin among eight surrounding pixels.

If exceeding the largest value: $FG[i, j]=Gmax$, if $FG[i, j]>(Gmax+Th4)$

If smaller than the smallest value: $FG[i, j]=Gmin$, if $FG[i, j]<(Gmin-Th4)$

It is to be noted that Th4 is a threshold value that determines the extent to which the peak of the interpolation value is to be tolerated. In addition, the number of surrounding pixels does not have to be 8 and may be any number that is larger than, for instance, 6.

Step S28: Low-Pass Filtering Processing on G-Interpolated Pixel

The image processing unit 15 executes direction-dependent low-pass filtering processing similar to the image processing achieved in the first embodiment on a G plane resulting from the G-interpolated processing.

(a) Direction-dependent low-pass filtering processing is performed on all the G pixels as in the image processing in the first embodiment.

(b) Direction-dependent low-pass filtering processing is implemented only on G pixels having undergone the interpolation processing without executing direction-dependent low-pass filtering processing on G pixels that have not been interpolated.

Step S29: Low-Pass Filtering Processing on Image Data Corresponding to a Plane Formed Through Color Difference Interpolation, i.e., Low-Pass Filtering Processing on Color Difference Interpolated Data.

The image processing unit 15 calculates weighting rates tt, yy, nu and ns for a G plane resulting from the interpolation processing, in a manner similar to that adopted in the image processing in the first embodiment. At a position corresponding to the pixel for which the weighting rates are already ascertained in step S28, the weighting rates obtained in step S28 are reused.

The image processing unit 15 executes direction-dependent low-pass filtering processing based upon the weighting rates on the color difference interpolated image data as expressed below.

Tmp_DR[i, j]=[FDR[i, j]+ k×tt(FDR[i, j−1]+FDR[i, j+1])+ k×yy(FDR[i−1, j]+FDR[i+1, j])+ k×nu(FDR[i−1, j+1]+FDR[i+1, j−1])+ k×ns(FDR[i−1, j−1]+FDR[i+1, j+1])]/(1+k×2)　　(expression 32)

Tmp_DB[i, j]=[FDB[i, j]+ k×tt(FDB[i, j−1]+FDB[i, j+1])+ k×yy(FDB[i−1, j]+FDB[i+1, j])+ k×nu(FDB[i−1, j+1]+FDB[i+1, j−1])+ k×ns(FDB[i−1, j−1]+FDB[i+1, j+1])]/(1+k×2)　　(expression 33)

with k representing a constant value used to adjust the extent of the low-pass filtering processing, which may be set to, for instance, k=½.

After completing the weighted averaging operation explained above for the entire image plane, the image processing unit 15 executes the following substitution:

FDR[i, j]=Tmp_DR[i, j]

FDB[i, j]=Tmp_DB[i, j]

Step S30: R and B Restoration

The image processing unit 15 restores R and B by adding the G plane having undergone the low-pass filtering processing to the color difference plane data.

FR[i, j]=FG[i, j]+FDR[i, j]　　(expression 34)

FB[i, j]=FG[i, j]+FDB[i, j]　　(expression 35)

The image processing unit 15 outputs FR[i, j], FG[i, j] and FB[i, j] thus obtained to a recording device or the like.

The advantages achieved in the electronic camera in the second embodiment described above are explained.

The electronic camera in the second embodiment achieves advantages similar to those achieved in the first embodiment. In addition, the electronic camera in the second embodiment realizes the following advantages.

(1) The image processing unit 15 implements low-pass filtering processing on G-interpolated pixels and color difference interpolated pixels. As a result, color artifact and jaggies attributable to the interpolation processing can be reduced to a satisfactory degree. In addition, if the image processing unit 15 performs low-pass filtering processing on G-interpolated pixels and color difference interpolated pixels alone and does not perform low-pass filtering processing on pixels that have not been interpolated, the original image data can be preserved faithfully and a reduction in the length of time required for the processing is achieved. It is to be noted that by performing the low-pass filtering processing on all the pixels, a smooth image with jaggies and the like removed satisfactorily is obtained.

(2) The image processing unit 15 limits the range of the peak of interpolated pixels prior to the low-pass filtering processing. Thus, the peak of the interpolated pixel becomes less noticeable and, at the same time, the peaks of the interpolated pixels are prevented from spreading to nearby pixels.

(3) The image processing unit 15 ascertains color differences relative to the G color component in the image data prior to the low-pass filtering processing when a large volume of information is available. Thus, a large volume of color difference information is obtained to enable even more accurate color difference interpolation.

(4) The image processing unit 15 uses the G color component obtained through the low-pass filtering processing to restore the R (B) color component based upon the color difference. Thus, a problem of noise and jaggies being introduced into the R (B) color component via the G color component is prevented.

(5) The image processing unit 15 ascertains the weighting rates for the G color component with a large volume of information available and performs low-pass filtering processing of the R (B) color component by using the weighting rates. As a result, compared to low-pass filtering performed at the weighting rates calculated by using the R (B) color component data, direction-dependent low-pass filtering processing with a higher degree of accuracy is achieved.

It is to be noted that the inventor of the present invention has confirmed that the direction-dependent low-pass filtering processing according to the present invention achieves good results regardless of whether the gradation conversion (including the gradation correction) is implemented either before or after the interpolation processing in the embodiment described above by conducting a subjective evaluation on the image quality.

It is to be noted that while the image processing unit 15 executes the image processing program in the embodiment explained above, the present invention is not limited to this example. For instance, part of or the entirety of the image processing described above may be executed by an arithmetic circuit or the like in order to improve the processing speed of the image processing unit 15.

In addition, while the low-pass filtering processing is executed on the color difference data in the embodiment described above, the present invention is not limited to this example. For instance, the low-pass filtering processing may be implemented on R (B) color component image data restored from the color difference data. In this case, too, by utilizing the weighting rates determined for the G color component, the low-pass filtering processing of the R (B) color component image data can be implemented with accuracy.

Furthermore, while the low-pass filtering processing is implemented on the color difference data (or R or B) in the embodiment described above, the present invention is not limited to this example. Since the improvement achieved with regard to the color difference or the R or B component is normally not as pronounced as the improvement achieved in the luminance component (G, Y), the low-pass filtering processing of the color difference data (or R or B) may be omitted. In such a case, an advantage is achieved in that the length of time required for the processing is reduced.

It is to be noted that the directional low-pass filtering may be implemented on any plane. For instance, the processing may be implemented on a Y plane synthesized from R, G and B.

Another embodiment is explained below.

Third Embodiment

The image processing method in the third embodiment is characterized in that at least two types of color information are used in similarity judgment. The following is an explanation of the operation performed to calculate first similarity values in the image processing in the third embodiment.

In the third embodiment, color information corresponding to three planes constituted of R, G and B is prepared for the calculation of the first similarity values. It is to be noted that if color information corresponding to three planes R, G and B is not available, the interpolation processing is performed first to obtain color information corresponding to three planes R, G and B.

In the third embodiment, the first similarity values for a pixel at an ith row and a jth column are calculated by using the color information corresponding to the three planes R, G and B thus obtained in the following expressions (110~113).

First similarity value along the vertical direction tt1:

$$tt1=a\times(|FG[i, j]-FG[i, j-1]|+|FG[i, j]-FG[i, j+1]|)+$$

$$b\times(|FG[i, j+1]-FG[i, j-1]|+|FG[i-1, j]-FG[i-1, j+2]|+$$

$$|FG[i-1, j]-FG[i-1, j-2]|)+$$

$$a1\times(|FR[i, j]-FR[i, j-1]|+|FR[i, j]-FR[i, j+1]|)+$$

$$b1\times(|fr[i, j+1]-FR[i, j-1]|+|FR[i-1, j]-FR[i-1, j+2]|+$$

$$|FR[i-1, j]-FR[i-1, j-2]|)+$$

$$a2\times(|FB[i, j]-FB[i, j-1]|+|FB[i, j]-FB[i, j+1]|)+$$

$$b2\times(|FB[i, j+1]-FB[i, j-1]|+|FB[i-1, jj-FB[i-1, j+2]|+$$

$$|FB[i-1, j]-FB[i-1, j-2]|) \quad \text{(expression 110)}$$

First similarity value along the horizontal direction yy1:

$$yy1=a\times(|FG[i, j]-FG[i-1, j]|+|FG[i, j]-FG[i+1, j]|)+$$

$$b\times(|FG[i+1, j]-FG[i-1, j]|+|FG[i, j-1]-FG[i+2, j-1]|+$$

$$|FG[i, j-1]-FG[i-2, j-1]|)+$$

$$a1\times(|FR[i, j]-FR[i-1, j]|+|FR[i, j]-FR[i+1, j]|)+$$

$$b1\times(|FR[i+1, j]-FR[i-1, j]|+|FR[i, j-1]-FR[i+2, j-1]|+$$

$$|FR[i, j-1]-FR[i-2, j-1]|)+$$

$$a2\times(|FB[i, j]-FB[i-1, j]|+|FB[i, j]-FB[i+1, j]|)+$$

$$b2\times(|FB[i+1, j]-FB[i-1, j]|+|FB[i, j-1]-FB[i+2, j-1]|+$$

$$|FB[i, j-1]-FB[i-2, j-1]|) \quad \text{(expression 111)}$$

First similarity value along the upward diagonal direction nu1:

$$nu1=a\times(|FG[i, j]-FG[i+1, j-1]|+|FG[i, j]-FG[i-1, j+1]|)+$$

$$b\times(|FG[i-2, j+1]-FG[i-1, j]|+|FG[i-1, j]-FG[i, j-1]|+$$

$$|FG[i, j-1]-FG[i+1, j-2]|)+$$

$$a1\times(|FR[i, j]-FR[i+1, j-1]|+|FR[i, j]-FR[i-1, j+1]|)+$$

$$b1\times(|FR[i-2, j+1]-FR[i-1, j]|+|FR[i-1, j]-FR[i, j-1]|+$$

$$|FR[i, j-1]-FR[i+1, j-2]|)+$$

$$a2\times(|FB[i, j]|FB[i+1, j-1]|+|FB[i, j]-FB[i-1, j+1]|)+$$

$$b2\times(|FB[i-2, j+1]-FB[i-1, j]|+|FB[i-1, j]-FB[i, j-1]|+$$

$$|FB[i, j-1]-FB[i+1, j-2]|) \quad \text{(expression 112)}$$

First similarity value along the downward diagonal direction ns1:

$$ns1=a\times(|FB[i, j]-FG[i-1, j-1]|+|FB[i, j]-FG[i+1, j+1]|)+$$

$$b\times(|FG[i-2, j-1]-FG[i-1, j]|+|FB[i-1, j]-FG[i, j+1]|+$$

$$|FG[i, j+1]-FG[i+1, j+2]|)+$$

$$a1\times(|FR[i, j]-FR[i-1, j-1]|+|FR[i, j]-FR[i+1, j+1]|)+$$

$$b1\times(|FR[i-2, j-1]-FR[i-1, j]|+|FR[i-1, j]-FR[i, j+1]|+$$

$$|FR[i, j+1]-FR[i+1, j+2]|)+$$

$$a2\times(|FB[i, j]-FB[i-1, j-1]|+|FB[i, j]-FB[i+1, j+1]|)+$$

$$b2\times(|FB[i-2, j-1]-FB[i-1, j]|+|FB[i-1, j]-FB[i, j+1]|+$$

$$|FB[i, j+1]-FB[i+1, j+2]|) \quad \text{(expression 113)}$$

It is to be noted that in the expressions above, FR ($\bigcirc,\Delta$), FG ($\bigcirc,\Delta$) and FB ($\bigcirc,\Delta$) are the individual values at the $\bigcirc$(th) row and the $\Delta$(th) column in the color information corresponding to the three planes R, G and B. In addition, a1, a, a2, b1, b and b2 represent weighting coefficients that determine the contribution factors of the R, G and B colors in the first similarity values.

Since the process in which direction-dependent low-pass filtering processing is performed based upon the first similarity values thus obtained is identical to that in the first embodiment or the second embodiment, and its explanation is omitted.

By implementing the image processing in the third embodiment, too, advantages similar to those achieved in the first embodiment and the second embodiment are realized. It should be noted as a feature particular to the third embodiment that the first similarity values are calculated by incorporating at least two types of color information in color image data. Thus, color boundaries can be ascertained with a high degree of accuracy even in an image in which the G plane sustains almost perfect uniformity and the R plane or the B plain alone changes. As a result, it becomes possible to remove noise and jaggies correctly while fully preserving such color boundaries.

It is to be noted that while the first similarity values are calculated by using R, G and B in the embodiment described above, the present invention is not limited to this example.

In a general way, similarity judgment should be performed by using at least two types of information related to the colors in the image. For instance, color difference values, complementary color values or another type of color values may be used as the color information.

In addition, appropriate image data Y may be first synthesized by using at least two types of color information in the color image data as expressed in (expression 114) below and a similarity judgment may be performed with regard to the image data Y.

$$Y = a \times G + b \times R + c \times B \quad \text{(expression 114)}$$

It is preferable that the weighting coefficients a, b and c in the expression above is set at values corresponding to the visual sensitivity of the individual types of color information to enable a similarity judgment to be made in conformance to the visual sensitivity. For instance, they may be set at: a=0.6, b=0.3 and c=0.1 when processing a regular image. As a further alternative, they may be set at: a=0.6, b=0.2 and c=0.2. Alternatively, the weighting coefficients a, b and c may be set at arbitrary values. In addition, when specifically judging the similarity regarding the R component, the weighting coefficient b should be set at the largest rate. The direction-dependent low-pass filtering performed by using the second similarity values thus prepared may be implemented on any plane, and it may be implemented on the Y plane.

It is to be noted that while the first similarity values are calculated at once using the calculation expressions above in the embodiment, the present invention is not limited to this example. For instance, a similarity judgment is performed for color information with a high degree of visual sensitivity only, and a similarity judgment may be implemented with regard to other color information only if the directionality of the image structure is unclear from the degree of similarity judged in the first judgement. In such an arithmetic operation performed over stages, the similarity judgment is performed first with regard to the color information manifesting a high degree of visual sensitivity and, as a result, low-pass filtering processing corresponding to the visual sensitivity can be executed. In addition, since the similarity can be ascertained through first arithmetic operation for the majority of pixels, the overall volume of arithmetic processing can be reduced.

Next, another embodiment is explained.

Fourth Embodiment

The electronic camera in the fourth embodiment is explained below. It is to be noted that since the structure of this camera is identical to that in the second embodiment (see FIG. 4), an explanation on its structure is omitted. FIG. 7 is a flowchart of the image processing operation performed in the fourth embodiment. It is to be noted that this image processing operation is achieved by replacing steps S28~S29 in the second embodiment (see FIG. 5) with steps S41~S45. The following is an explanation on the difference from the second embodiment.

Step S41: Calculation of First Similarity Values between same color pixels and different color pixels The Bayer array image data ORG read out from the image capturing element 13 are still present in the image memory 18. The image data ORG are color image data having undergone white balance processing but yet to undergo color interpolation processing.

The image processing unit 15 calculates first similarity values in the neighboring area around a target pixel at an ith row and a jth column by executing the following arithmetic operation on the image data ORG. It is to be noted that the pixel value corresponding to a given pixel in the image data ORG is uniformly expressed as Z (○,△) regardless of which color among R, G and B the data correspond to.

First similarity value along the vertical direction tt1:

tt1=p1×(|Z[i, j]−Z[i, j−1]|+|Z[i, j]−Z[i, j+1]|)+ p2×(|Z[i−1, j]−Z[i−1, j−1]|+|Z[i−1, j]−Z[i−1, j+1]|)+ p3×(|Z[i, j+1]−Z[i, j−1]|+|Z[i, j]−Z[i, j−2]|+|Z[i, j]−Z[i, j+2]|)+ p4×(|z[i−1, j+1]−Z[i−1, j−1]|+|Z[i−1, j]−Z[i−2, j−2]|+

|Z[i−1, j]−Z[i−1, j+2]|)  (expression 124)

First similarity value along the horizontal direction yy1:

yy1=q1×(|Z[i, j]−Z[i−1, j]|+|z[i, j]−Z[i+1, j]|)+ q2×(|Z[i, j−1]−Z[i−1, j−1]|+|Z[i, j−1]−Z[i+1, j−1]|)+ q3×(|Z[i+1, j]−Z[i−1, j]|+|Z[i, j]−Z[i+2, j]|+|Z[i, j]−Z[i−2, j]|)+ q4×(|Z[i+1, j−1]−Z[i−1, j−2]|+|Z[i, j−1]−Z[i+2, j−1]|+

|Z[i, j−1]−Z[i−2, j−1]|)  (expression 125)

First similarity value along the upward diagonal direction nu1:

nu1=r1×(|Z[i, j]−Z[i+1, j−1]|+|Z[i, j]−Z[i−1, j+1]|)+ r2×(|z[i−1, j]−Z[i, j−1]|+|Z[i−1, j]−Z[i−2, j+1]|)+ r3×(|Z[i−1, j+1]−Z[i+1, j−1]|+|Z[i, j]−Z[i+2, j−2]|+

|Z[i, j]−Z[i−2, j+2]|)+ r4×(|Z[i−2, j+1]−Z[i, j−1]|+|Z[i−1, j]−Z[i+1, j−2]|)  (expression 126)

First similarity value along the downward diagonal direction ns1:

ns1=s1×(|Z[i, j]−Z[i−1, j−1]|+|Z[i, j]−Z[i+1, j+1]|)+ s2 ×(|Z[i+1, j]−Z[i, j−1]|+|Z[i+1, j]−Z[i+2, j+1]|)+ s3×(|Z[i+1, j+1]−Z[i−1, j−1]|+|Z[i, j]−Z[i−2, j−2]|+

|z[i, j]−Z[i+2, j+2]|)+ s4×(|Z[i+2, j+1]−Z[i, j−1]|+|z[i+1, j]−Z[i−1, j−2]|)  (expression 127)

In the expressions above, Z (○,△) represents one of value corresponding to R, G or B at the ○(th) row and the △(th) column in the image data ORG. In other words, Z (○,△) represents the G component pixel value at a position at which a G pixel is located, the R component pixel value at a position at which an R pixel is located and the B component pixel value at a position at which a B pixel is located. In addition, p1~4, q1~4, r1~4 and s1~4 are weighting coefficients that determine the contribution factors of the individual terms in the first similarity values, and may all be set at 1, for instance.

In addition, the addition of the absolute values may be weighted. For instance, the third term in (expressions 124) may be weighted as follows.

p3×(|z[i, j+1]−Z[i, j−1]|+u·|Z[i, j]−

Z[i, j−2]|+v·|z[i, j]−Z[i, j+2]|)

It is to be noted that it is desirable to set u and v at approximately ½.

Step S42: Weighting Adjustments for First Similarity Values Along Individual Directions The image processing unit 15 adjusts the weightings for the calculated first similarity values along the individual directions as indicated in (a) below.

(a) tt1=tt1×2, yy1=yy1×2, nu1=nu1, ns1=ns1

Through these weighting adjustments, the first similarity values along the diagonal directions are set relatively low to indicate a high degree of similarity and thus, the weighting rates along the diagonal directions are set high in the direction-dependent low-pass filtering processing. As a result, a marked advantage is achieved in that, for instance, in an image capturing element manifesting a level difference such as a gain difference between an odd-numbered column (row) and an even numbered column (row), the noise attributable to the level difference is canceled. It is to be noted that if the weighting is not adjusted along the individual directions, the first similarity values are as indicated in (b) below.

(b) tt1=tt1, yy1=yy1, nu1=nu1, ns1=ns1

In an actual application, it is even more desirable to execute an appropriate weighting adjustment in correspondence to characteristics (defects) of the image data. In more specific terms, a final decision should be made as to whether the weighting values in (a) or (b) above or another set of weighting values are to be used through a subjective evaluation test of a test image or the like.

Step S43: Determining Weighting Rates

The image processing unit 15 calculates the representative value m1 by performing the following averaging operation on the first similarity values.

$$m1=(tt1+yy1+nu1+ns1)/4 \quad \text{(expression 128)}$$

The image processing unit 15 implements the following nonlinear conversion based upon the first similarity values tt1, yy1, nu1 and ns1 along the four directions and the representative value m1 to calculate second similarity values tt2, yy2, nu2 and ns2 along the four directions.

$$tt2=\max\{m1-tt1+\delta, \gamma\} \quad \text{(expression 129)}$$

$$yy2=\max\{m1-yy1+\delta, \gamma\} \quad \text{(expression 130)}$$

$$nu2=\max\{m1-nu1+\delta, \gamma\} \quad \text{(expression 131)}$$

$$ns2=\max\{m1-ns1+\delta, \gamma\} \quad \text{(expression 132)}$$

with $\delta$ and $\gamma$ set at, for instance $\delta=1$ and $\gamma=0$.

Next, the image processing unit 15 normalizes the second similarity values tt2, yy2, nu2 and ns2 along the four directions to ascertain weighting rates tt, yy, nu and ns along the four directions.

$$m2=tt2+yy2+nu2+ns2 \quad \text{(expression 133)}$$

$$tt=tt2/m2 \quad \text{(expression 134)}$$

$$yy=yy2/m2 \quad \text{(expression 135)}$$

$$nu=nu2/m2 \quad \text{(expression 136)}$$

$$ns=ns2/m2 \quad \text{(expression 1373)}$$

Step S44: direction-dependent low-pass filtering Processing for G Plane

The image processing unit 15 performs weighted averaging by adding weighted pixel values of neighboring pixels to the pixel value of the target pixel FG[i, j] and then calculates a pixel FG[i, j] after the low-pass filtering processing using (expression 138).

$$Tmp\_FG[i, j]=\{FG[i, j]+$$

$$k\times tt(FG[i, j-1]+FG[i, j+1])+$$

$$k\times yy(FG[i-1, j]+FG[i+1, j])+$$

$$k\times nu(FG[i-1, j+1]+FG[i+1, j-1])+$$

$$k\times ns(FG[i-1, j-1]+FG[i+1, j+1])\}(1+k\times 2) \quad \text{(expression 138)}$$

with k representing a numerical value used to adjust the extent of the low-pass filtering processing, which may be set at, for instance, k=½.

Step S45: Low-Pass Filtering Processing on Color Difference Interpolated Pixel

The image processing unit 15 executes direction-dependent low-pass filtering processing of color difference interpolated pixels by using the following expressions.

$$Tmp\_DR[i, j]=\{FDR[i, j]+$$

$$k\times tt(FDR[i, j-1]+FDR[i, j+1])+$$

$$k\times yy(FDR[i-1, j]+FDR[i+1, j])+$$

$$k\times nu(FDR[i-1, j+1]+FDR[i+1, j-1])+$$

$$k\times ns(FDR[i-1, j-1]+FDR[i+1, j+1])\}/(1+k\times 2) \quad \text{(expression 139)}$$

$$Tmp\_DB[i, j]=\{FDR[i, j]+$$

$$k\times tt(FDB[i, j-1]+FDB[i, j+1])+$$

$$k\times yy(FDB[i-1, j]+FDB[i+1, j])+$$

$$k\times nu(FDB[i-1, j+1]+FDB[i+1, j-1])+$$

$$k\times ns(FDB[i-1, j-1]+FDB[i+1, j+1])\}/(1+k\times 2) \quad \text{(expression 140)}$$

with k representing a constant value used to adjust the extent of the low-pass filtering processing, which may be set at, for instance, k=½.

When the direction-dependent low-pass filtering processing for the entire image plane is completed, the image processing unit 15 executes the following substitutions.

$$FG[i, j]=Tmp\_FG[i, j]$$

$$FDR[i, j]=Tmp\_DR[i, j]$$

$$FDB[i, j]=Tmp\_DB[i, j]$$

The electronic camera in the fourth embodiment achieves advantages similar to those achieved in the camera in the second embodiment. As a particular advantage to the electronic camera in the fourth embodiment, the processing scale is kept down since the first similarity values are calculated by using the data yet to undergo interpolation processing.

In addition, it is desirable to calculate differences in the characteristics of different color pixels by using color image data having undergone white balance processing. Since the white balance processing suppresses any extreme bias in color in advance, the risk of making an erroneous judgment with regard to similarity due to a color bias can be reduced.

It is to be noted that the inventor of the present invention has confirmed that the direction-dependent low-pass filtering processing according to the present invention achieves good results regardless of whether the gradation conversion and the gradation correction are implemented either before or after the interpolation processing in the embodiment described above by conducting a subjective evaluation on the image quality.

It is to be noted that while the image processing unit 15 executes the image processing program in the embodiment explained above, the present invention is not limited to this example. For instance, part of or the entirety of the image processing described above may be executed by an arithmetic circuit or the like in order to improve the processing speed of the image processing unit 15.

It is to be noted also that it is desirable to lower the contribution factor of the characteristics difference between different color pixels in a first similarity value when image data manifest a high degree of the saturation and to raise the contribution factor of a characteristics difference between different color pixels in a first similarity value when image data manifest a low degree of saturation.

FIG. 8 is a flowchart of an operation in which an automatic adjustment of the contribution factor is incorporated. The following is an explanation of the operation added to the processing achieved in the fourth embodiment.

Step S51: Calculation of Two Types of Saturation

The image processing unit 15 calculates saturations CCt and CCy at an ith row and a jth column in the image data ORG by using the following expressions.

$$CCt=(|Z[i, j-1]-Z[i, j]|+|z[i, j+1]-Z[i, j]|)/2$$

$$CCy=(|Z[i-1, j]-Z[i, j]|+|z[i+1, j]-Z[i, j]|)/2$$

Step S52: Saturation Judgment

The image processing unit 15 performs a judgment in conformance to the following conditional expression.
(CCt>BWth) and (CCy>BWth)

When the two types of saturation CCt and CCy both exceed the threshold value BWth, it is likely that the current position manifests a high degree of saturation. In this case, the image processing unit 15 reduces the values of coefficients p1~2, q1~2, r1~2 and s1~2 of characteristics differences among different color pixels and increases the values of coefficients p3~4, q3~4, r3~4, and s3~4 of characteristics differences among the same color pixels to lower the contribution factors of the characteristics differences among different color pixels.

If, on the other hand, either one of the two types of saturation CCt and CCy is smaller than the threshold value BWTh, the current position is determined to manifest a low degree of saturation. In this case, the image processing unit 15 raises the contribution factor of the characteristics difference between different color pixels by, for instance, increasing the values of the coefficients p1~2, q1~2, r1~2, and s1~2 of characteristics differences among different color pixels.

It is to be noted that the values of the coefficients may be adjusted as follows.

(a) Complete switch between same color pixels and different color pixels

If it is decided that the current position manifests a high degree of saturation, the image processing unit 15 sets the values of the coefficients p1~2, q1~2, r1~2, and s1~2 for the characteristics differences among different color pixels to 0 and sets the values of the coefficients p3~4, q3~4, r3~4, and s3~4 for the characteristics differences among same color pixels to 1. If, on the other hand, the current position is decided to manifest a low degree of saturation, the image processing unit 15 sets values of the coefficients p1~2, q1~2, r1 ~2 and s1~2 of the characteristics differences among different color pixels to 1 and sets values of the coefficients p3~4, q3~4, r3~4, and s3~4 of characteristics differences among same color pixels to 0.

(b) Using characteristics difference between the same color pixels alone when manifesting a high degree of saturation If it is decided that the current position manifests a high degree of saturation, the image processing unit 15 sets values of the coefficients p1~2, q1~2, r1~2 and s1~2 of characteristics differences among different color pixels to 0 and sets the values of the coefficients p3~4, q3~4, r3~4, and s3~4 of characteristics differences among the same color pixels to 1. If, on the other hand, the current position is determined to manifest a low degree of saturation, the image processing unit 15 sets the values of the coefficients p1~2, q1~2, r1~2 and s1~2 of the characteristics differences among different color pixels to 1 and also sets the values of the coefficients p3~4, q3~4, r3~4, and s3~4 of characteristics differences among same color pixels to 1.

By varying the contribution factors of the characteristics differences among different color pixels in the first similarity values in correspondence to the degree of saturation as described above, the risk of erroneously deciding that a position manifesting a high degree of saturation constitutes part of the image structure is reduced. As a result, it becomes possible to make a more accurate judgment with regard to the directionality of the image structure when executing the direction-dependent low-pass filtering processing.

To be more exact, r1 and s1 are the coefficients of the characteristics differences among same color pixels when the target position is at a G pixel, and r2 and s2 are the coefficients of the characteristics differences among same color pixels when of the target position is at R and B pixels. Accordingly, the values of r1~2 and s1 ~2 may be further adjusted in correspondence to whether the target position is at a G pixel or a R and B pixels. In such a case, an advantage is achieved in that an even more accurate judgment can be made with regard to the image structure. However, there is a risk in that calculated first similarity values may fluctuate depending upon the pixel position to result in a grid-like pattern manifesting after the direction-dependent low-pass filtering processing. If such a problem is likely to occur, it is more desirable to handle r1~2 and s1~2 uniformly as the coefficients of the characteristics differences among different color pixels as in the processing described earlier.

It is to be noted that while individual methods of similarity judgment with different features are explained in reference to the first~fourth embodiments, these methods may be combined as appropriate or the results of the judgments performed the individual methods may be compared to use the results indicating a pronounced difference or to use the results representing the average of the various methods. By combining the individual methods in such a manner, similarity judgment achieving an even higher degree of accuracy is enabled.

In addition, the names of the variables such as the first similarity values in the first~fourth embodiments are matched with the names of variables in the claims to simplify the explanation. However, such a specific description does not necessarily limit the contents of the variables in the claims.

It is to be noted that while an explanation is given in reference to the first through fourth embodiments on image data obtained in a matrix pixel array or a Bayer array, the present invention is not limited to these examples. For instance, the present invention may be adopted in a honeycomb pixel array or any other special pixel array, as long as the "at least four directions" and "the values of the weighting rates" are determined as appropriate by taking into consideration the distances between pixels along the individual directions.

What is claimed is:

1. An image processing method for implementing low-pass filtering on image data, comprising:
   a similarity judging step in which similarity among pixels are judged along four directions in a local area containing a target pixel undergoing low-pass filtering processing; and
   a direction-dependent low-pass filtering step of performing a weighted averaging operation in which weighted pixel values of pixels around a target pixel are added to a pixel value of said target pixel and a result of said addition is divided by a sum of the weights, a weighting rate along a direction manifesting marked similarity becoming increased based upon said judgment obtained in said similarity judging step, wherein:
   in said similarity judging step, first similarity values tt1, yy1, nu1 and ns1 along four directions are calculated using absolute values of differences among pixel values of a plurality of pixels along each direction within said local area;
   a representative value m1 is calculated by averaging or taking a median of said first similarity values tt1, yy1, nu1 and ns1 along four directions;
   second similarity values tt2, yy2, nu2 and ns2 are calculated based upon said first similarity values tt1, yy1, nu1 and ns1 along four directions and said representative value m1, where at least one of second similarity values tt2, yy2, nu2 and ns2 is 0 except in a case in which said first similarity values tt1, yy1, nu1 and ns1 are same, and as said second similarity values tt2, yy2, nu2 and ns2 become larger, a degree of similarity among pixels increases, and
   in said direction-dependent low-pass filtering step, weighting rates for neighboring pixels located along four directions are determined in correspondence to said calculated second similarity values tt2, yy2, nu2 and ns2, the pixel values of pixels around said target pixel are weighted by said weighting rates.

2. An image processing method according to claim 1, wherein:
   said second similarity values tt2, yy2, nu2 and ns2 are calculated using expressions 1–4:

$$tt2 = \max\{m1 - tt1 + \delta, \gamma\} \quad \text{(expression 1)}$$

$$yy2 = \max\{m1 - y1 + \delta, \gamma\} \quad \text{(expression 2)}$$

$$nu2 = \max\{m1 - nu1 + \delta, \gamma\} \quad \text{(expression 3)}$$

$$ns2 = \max\{m1 - ns1 + \delta, \gamma\} \quad \text{(expression 4)}$$

(where $\delta$ and $\gamma$ in the expressions above each represents a predetermined value which may be 0).

3. An image processing method according to claim 1, wherein:
   said image data are color image data; and
   said similarity is judged based upon at least two types of color information in said color image data in said similarity judging step.

4. An image processing method according to claim 3, wherein:
   said similarity is judged based upon color image data yet to undergo interpolation processing in said similarity judging step.

5. An image processing method according to claim 1, wherein:
   said image data are image data having undergone interpolation processing to interpolate pixels with missing color components; and
   said low-pass filtering processing is implemented only on target pixels having undergone said interpolation processing in said direction-dependent low-pass filtering step.

6. An image processing method according to claim 1, wherein:
   said image data are image data having undergone interpolation processing to interpolate pixels with missing color components; and
   a pixel value of each pixel having undergone said interpolation processing is limited by a threshold value corresponding to a largest pixel value or a smallest pixel value in a specific area near the corresponding pixel prior to the low-pass filtering processing in the similarity judging step.

7. An image processing method according to claim 1, wherein:
   said image data are color image data having, at least, a first color with a highest pixel density and a second color with a low pixel density and vacancies of color information, said image processing method further comprising:
   a color difference calculating step in which a color difference between said second color and said first color is obtained for each pixel at which said second color is present;
   a color difference interpolating step in which a color difference interpolation value is obtained for a pixel at which said second color is not present based upon said color difference obtained in said color difference calculating step; and
   a second color restoring step in which said second color is restored based upon said color difference interpolation value obtained in said color difference interpolating step and a pixel value of said first color, wherein:
   said first color used to calculate said color difference in said color difference calculating step is said first color that has not undergone said low-pass filtering processing.

8. An image processing method according to claim 7, wherein:
   said first color used in restoring said second color in said second color restoring step is said first color that has undergone said low-pass filtering processing.

9. An image processing method according to claim 1, wherein:
   in said direction-dependent low-pass filtering step, a first weighting rate, a second weighting rate, a third weighting rate, a fourth weighting rate and a fifth weighting rate are respectively applied for said target pixel, pixels above and below said target pixel, pixels next to said target pixel on the right and left, pixel above said target pixel on the right and pixel below said target pixel on the left, pixel above said target pixel on the left and pixel below said target pixel on the right; and said second, third, fourth and fifth weighting rates along a direction manifesting marked similarity becomes increased.

10. An image processing method according to claim 9, wherein: said first weighting rate is $1/(1+2k)$, said second weighting rate is $k \times tt/(1+2k)$, said third weighting rate is $k \times yy/(1+2k)$, said fourth weighting rate is $k \times nu/(1+2k)$ and said fifth weighting rate is $k \times ns/(1+2k)$, where k represents a predetermined value, and tt, yy, nu and ns satisfy the following equation: $tt+yy+nu+ns=1$.

* * * * *